US010766517B2

(12) United States Patent
Cheng et al.

(10) Patent No.: US 10,766,517 B2
(45) Date of Patent: Sep. 8, 2020

(54) STROLLER ASSEMBLY

(71) Applicant: Strova, Inc., Philadelphia, PA (US)

(72) Inventors: Huang-Yi Cheng, Taibao (TW); Ping-Ching Lin, Taibao (TW); Lisa Yanz Lehman, Brooklyn, NY (US); Oscar Frias, Brooklyn, NY (US); Mark Prommel, Brooklyn, NY (US); Jeffrey Myer, Lancaster, PA (US); Theodore Iobst, Philadelphia, PA (US)

(73) Assignee: Strova, Inc., Philadelphia, PA (US)

( * ) Notice: Subject to any disclaimer, the term of this patent is extended or adjusted under 35 U.S.C. 154(b) by 0 days.

(21) Appl. No.: 16/354,818

(22) Filed: Mar. 15, 2019

(65) Prior Publication Data

US 2019/0283790 A1    Sep. 19, 2019

Related U.S. Application Data

(60) Provisional application No. 62/643,909, filed on Mar. 16, 2018, provisional application No. 62/646,231, filed on Mar. 21, 2018.

(51) Int. Cl.
*B62B 7/08*   (2006.01)
*B62B 9/26*   (2006.01)
*B62B 7/06*   (2006.01)

(52) U.S. Cl.
CPC ............. *B62B 7/08* (2013.01); *B62B 7/064* (2013.01); *B62B 9/26* (2013.01)

(58) Field of Classification Search
CPC .............................................. B62B 7/06–064
See application file for complete search history.

(56) References Cited

U.S. PATENT DOCUMENTS

| 3,836,164 A | * | 9/1974 | Sugino | B62B 7/068 280/642 |
| 3,848,884 A | * | 11/1974 | Lines | B62B 7/068 280/644 |
| 2008/0029983 A1 | * | 2/2008 | Yang | B62B 7/062 280/47.38 |
| 2014/0015228 A1 | * | 1/2014 | Kikui | B62B 7/042 280/650 |
| 2019/0168794 A1 | * | 6/2019 | Eyman | B62B 9/00 |
| 2019/0256120 A1 | * | 8/2019 | Oakes | B62B 7/08 |
| 2019/0322304 A1 | * | 10/2019 | Zhong | B62B 7/145 |
| 2019/0337550 A1 | * | 11/2019 | Eggert-Crowe | B62B 7/14 |
| 2020/0031376 A1 | * | 1/2020 | Horowitz | B62B 3/025 |

* cited by examiner

*Primary Examiner* — Erez Gurari
(74) *Attorney, Agent, or Firm* — Condo Roccia Koptiw LLP

(57) ABSTRACT

A stroller assembly may include a stroller frame, a plurality of wheels, and a support. The stroller frame may include a front horizontal bar and a rear horizontal bar. The stroller frame may be configured to operate between an open position and a collapsed position. The plurality of wheels may be connected to the stroller frame. The plurality of wheels may include one or more front wheels and one or more rear wheels. The support may be connected to the stroller frame. The support may include a first arm, a second arm, and a support wheel. The support and the one or more rear wheels may be configured to support the stroller assembly in a substantially vertical position when the stroller frame is in the collapsed position.

10 Claims, 27 Drawing Sheets

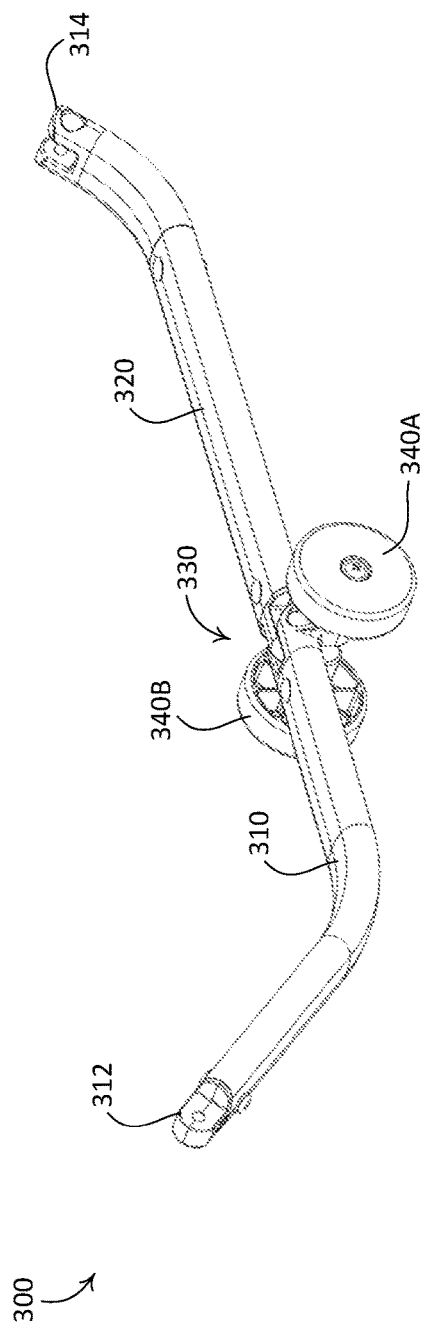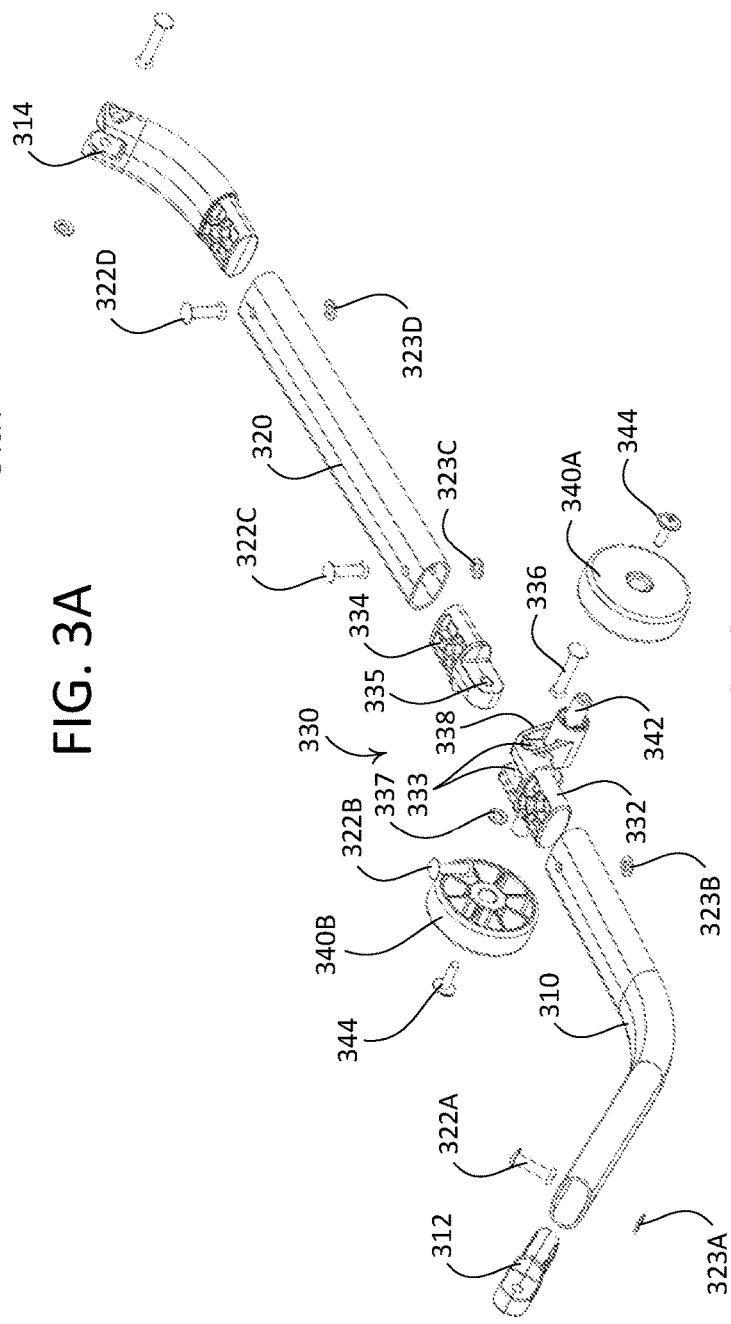
FIG. 3A
FIG. 3B

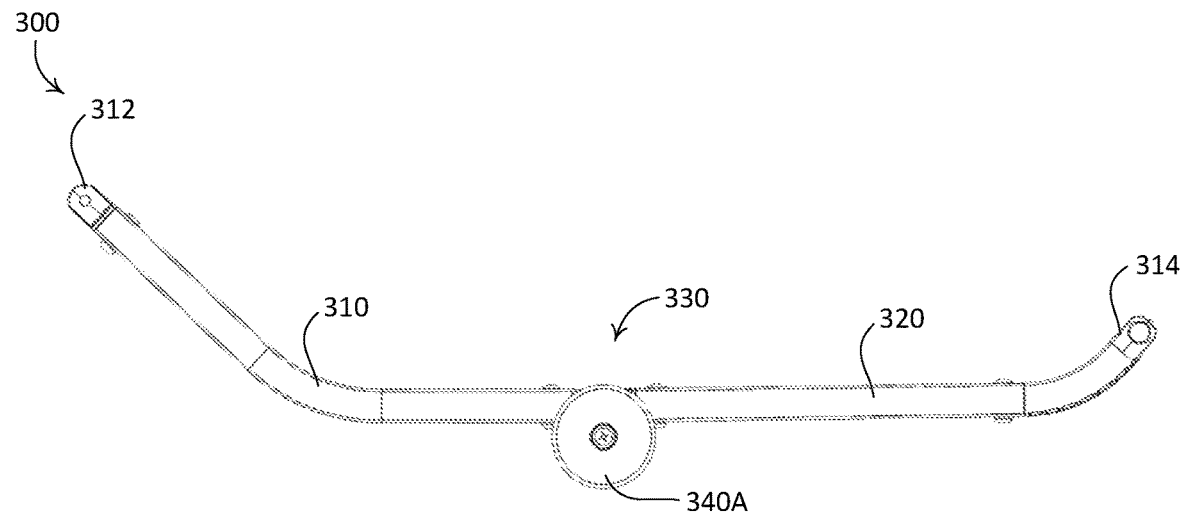
FIG. 3C
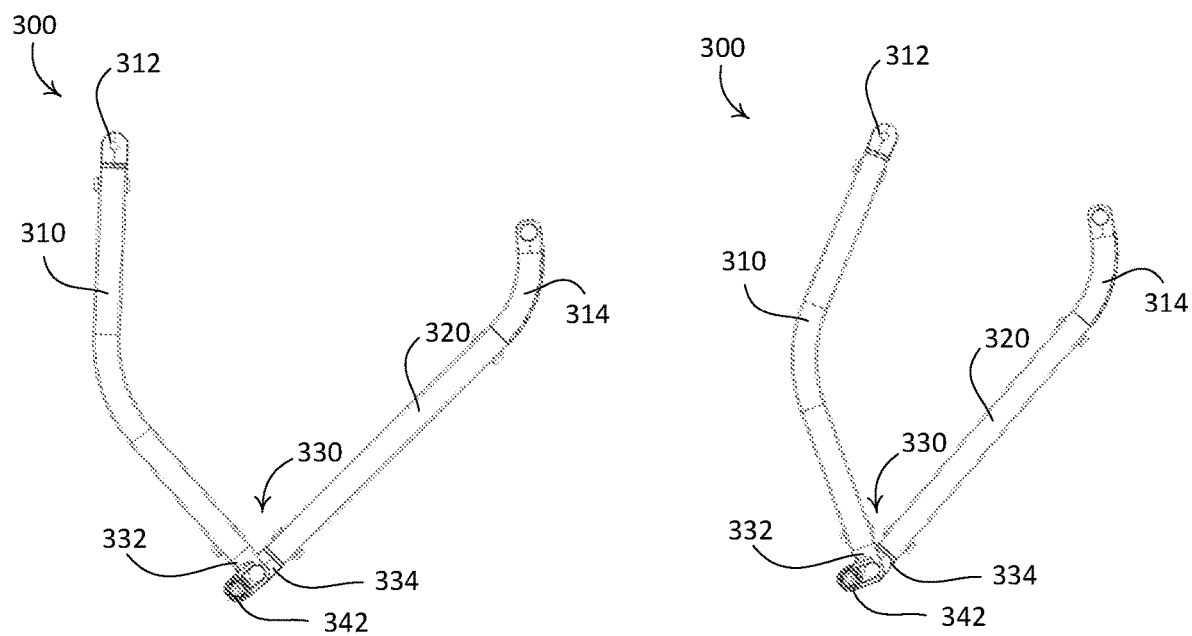
FIG. 3D
FIG. 3E

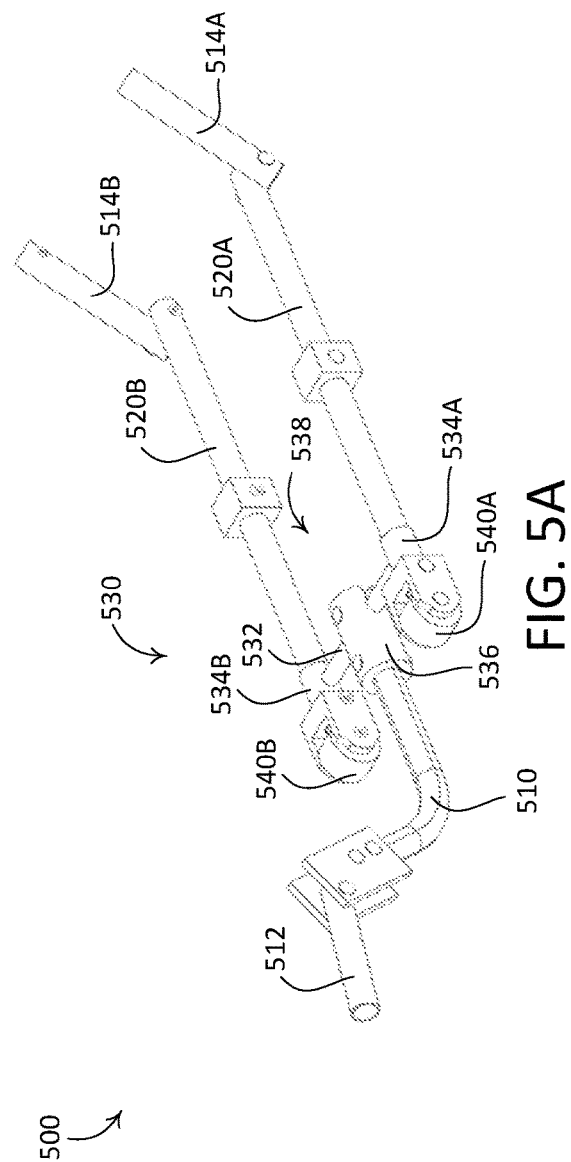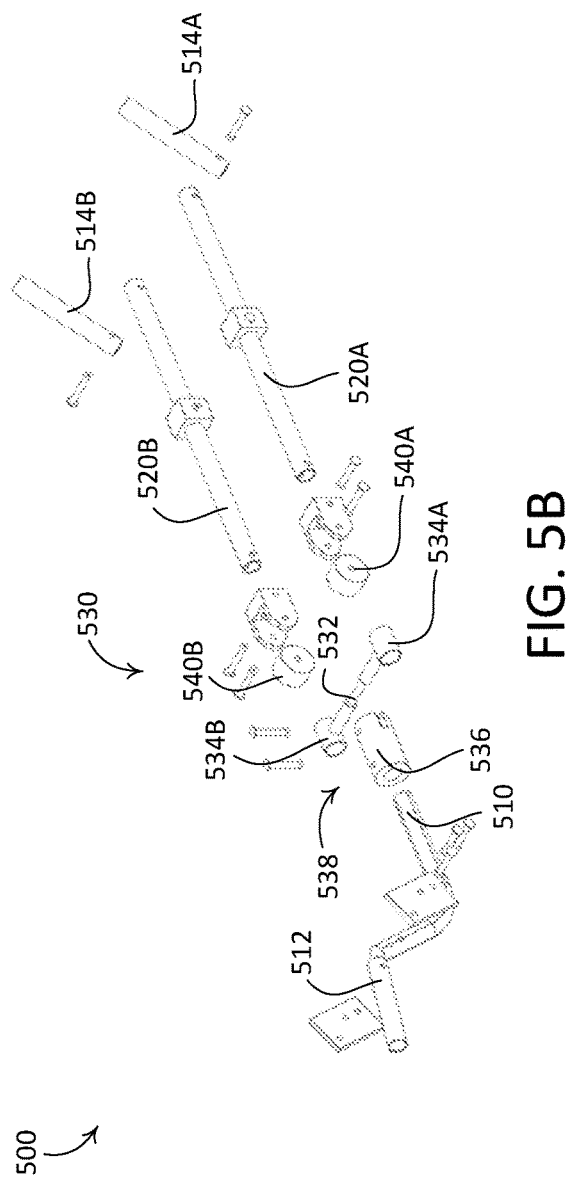

STROLLER ASSEMBLY

CROSS-REFERENCE TO RELATED APPLICATIONS

This application claims the benefit of U.S. Provisional Patent Application No. 62/643,909, filed Mar. 16, 2018, and U.S. Provisional Patent Application No. 62/646,231, filed Mar. 21, 2018 the contents of which are hereby incorporated by reference in their entirety.

BACKGROUND

Strollers are well known. A stroller may be used to transport children. A stroller may include a frame with a handlebar, one or more seats for children, a storage compartment, and/or a plurality of wheels connected to the frame. The plurality of wheels may be configured to engage the ground such that the stroller may be pushed or pulled. The frame may be configured to fold and/or collapse for storage and/or transport.

SUMMARY

As described herein, a stroller assembly may include a stroller frame, a plurality of wheels, and/or a support. The stroller frame may include a front horizontal bar and a rear horizontal bar. The stroller frame may be configured to operate between an open position and a collapsed position. The front horizontal bar may be configured to move toward the rear horizontal bar when the stroller frame is operated from the open position to the collapsed position. The front horizontal bar may be configured to move away from the rear horizontal bar when the stroller frame is operated from the collapsed position to the open position. The plurality of wheels may be connected to the stroller frame. The plurality of wheels may include one or more front wheels and one or more rear wheels. The support may be connected to the stroller frame. The support may include a first arm, a second arm, and a support wheel. The support wheel may not contact the ground when the stroller frame is in the open position. The first arm may be connected to the front horizontal bar and the second arm. The second arm may be connected to the rear horizontal bar and the first arm. The support and the one or more rear wheels may be configured to support the stroller assembly in a substantially vertical position when the stroller frame is in the collapsed position.

The support may include a joint (e.g., a revolute joint) having a pin that extends therethrough. The support wheel may be connected to the joint. The joint may include a female portion and a male portion. The female portion may be connected to an end of the first arm. The male portion may be connected to an end of the second arm. The female portion and the male portion may define holes therethrough. The holes may be configured to receive the pin.

The joint may include a linkage connected to a sleeve. The sleeve may be configured to receive and/or slidingly operate along the first arm as the stroller frame is operated between the open position and the collapsed position. The linkage may be connected to the second arm. The joint may include an extension extending from the sleeve. The extension may be configured to attach to the linkage, for example, via a joint (e.g., a revolute joint). A pin may extend through the linkage and the extension. The support wheel may be connected to the first arm.

The sleeve may be configured to receive and/or slidingly operate along the second arm as the stroller frame is operated between the open position and the collapsed position. The support wheel may be configured to abut the ground and rotate when the stroller frame is in the collapsed position, for example, to enable the stroller assembly to be pushed and/or pulled when in the substantially vertical position. The first arm and the second arm may be hollow aluminum tubes. The first arm may be attached at a midpoint of the front horizontal bar. The second arm may be attached at a midpoint of the rear horizontal bar. The stroller assembly may include a basket. The support may be below the basket when the stroller frame is in the open position. The support may be curved, for example, to enable the basket to be installed above the support.

As described herein, a stroller assembly may include a stroller frame, a plurality of wheels, a seat assembly, and/or a storage assembly. The stroller frame may include a front horizontal bar, a rear horizontal bar, and one or more side bars. The stroller frame may be configured to operate between an open position and a collapsed position. The front horizontal bar may be configured to move toward the rear horizontal bar when the stroller frame is operated from the open position to the collapsed position. The front horizontal bar may be configured to move away from the rear horizontal bar when the stroller frame is operated from the collapsed position to the open position. The plurality of wheels may be connected to the stroller frame. The plurality of wheels may include one or more front wheels and one or more rear wheels. The seat assembly may be configured to connect to the stroller frame. The storage assembly may be connected to the stroller frame, for example, such that the storage assembly is accessible when the stroller frame is in the open position and the collapsed position.

The storage assembly may be connected to the stroller frame below the seat assembly. The storage assembly may be configured to pivot upward to a first position when the stroller frame is operated from the open position to the collapsed position. The storage assembly may include a storage assembly frame and a basket configured to attach to the storage assembly frame. The storage assembly frame may be attached to the side bars. The basket may be fabric and/or plastic. The storage assembly may be configured to be manually operated from the first position to a second position when the stroller frame is in the collapsed position. The storage assembly may be accessible when in the first position. The storage assembly man not be accessible when in the second position. The stroller assembly may include a latch. The latch may be configured to engage a portion of the storage assembly frame, for example, to lock the storage assembly in the second position.

The storage assembly frame may attach to the side bars, for example, via a pivot joint. The stroller frame may include an extension that extends from the side bars. The extension may be configured to apply a force to the storage assembly frame when the stroller is operated between the open position and the collapsed position such that the storage assembly is operated to the first position. The stroller frame may include one or more rear legs attached to the side bars. The rear legs may include a brace. The storage assembly may include an adapter. The adapter may be connected to the storage assembly frame. The adapter may include a finger extending therefrom. The finger may be supported by the brace when the stroller frame is in the open position, for example, such that the storage assembly is supported by the brace.

The stroller assembly may include a support connected to the stroller frame. The support may include a first arm, a second arm, and a support wheel. The first arm may be connected to the front horizontal bar and the second arm. The second arm may be connected to the rear horizontal bar and the first arm. The support and the one or more rear wheels may be configured to maintain the stroller assembly in a substantially vertical position when the stroller frame is in the collapsed position.

BRIEF DESCRIPTION OF THE DRAWINGS

FIG. 3A is an isometric view of an example support for a stroller assembly.

FIG. 3B is an exploded view of the example support shown in FIG. 3A.

FIG. 3C is a side view of the example support shown in FIG. 3A when the stroller assembly is in an open position.

FIG. 3D is a side view of the example support shown in FIG. 3A when the stroller assembly is in an intermediate position.

FIG. 3E is a side view of the example support shown in FIG. 3A when the stroller assembly is in a collapsed position.

FIG. 5A is an isometric view of another example support for a stroller assembly.

FIG. 5B is an exploded view of the example support shown in FIG. 5A.

DETAILED DESCRIPTION

Figure 1A:
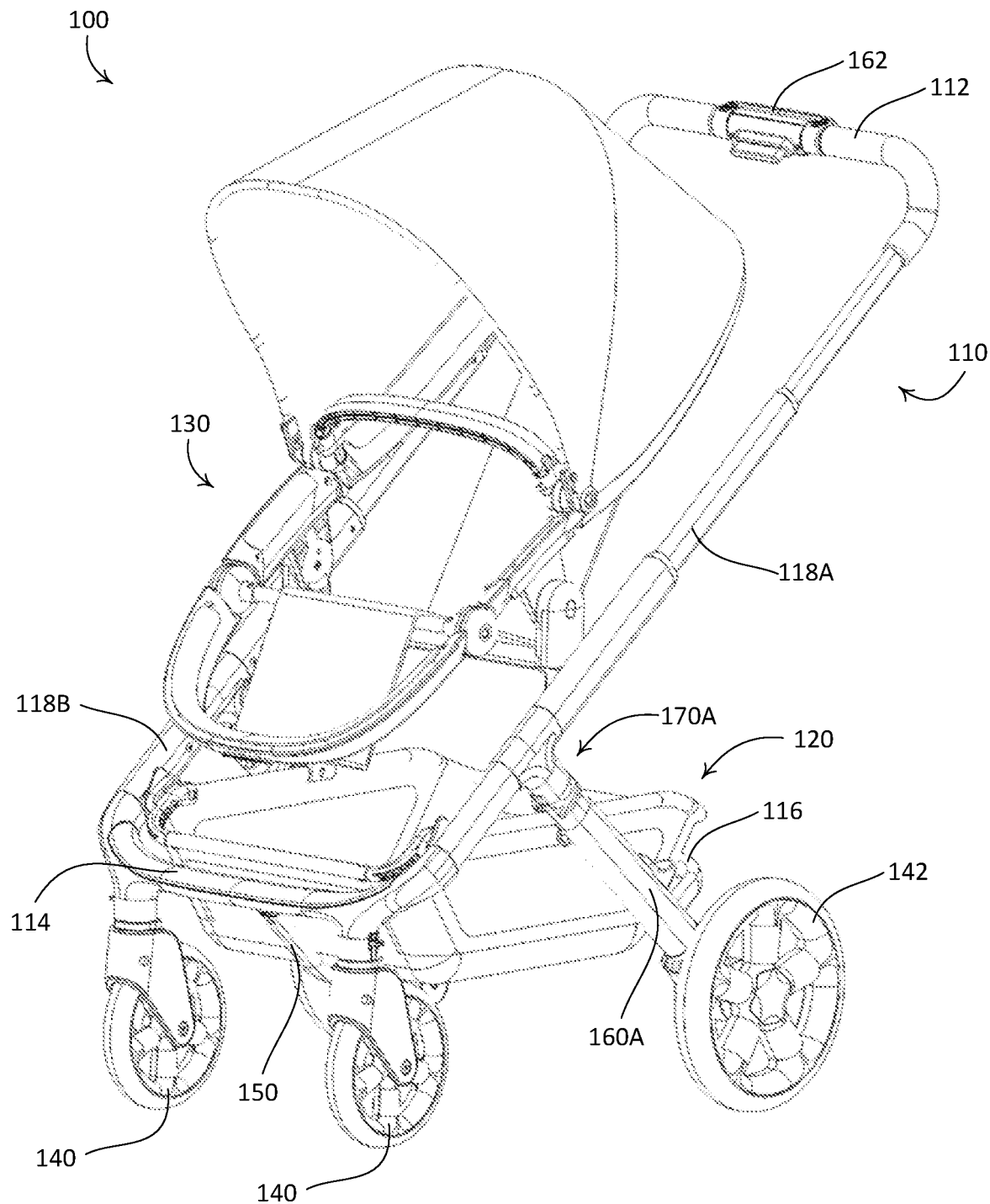
FIG. 1A is a front isometric view of an example stroller assembly.
Figure 1B:
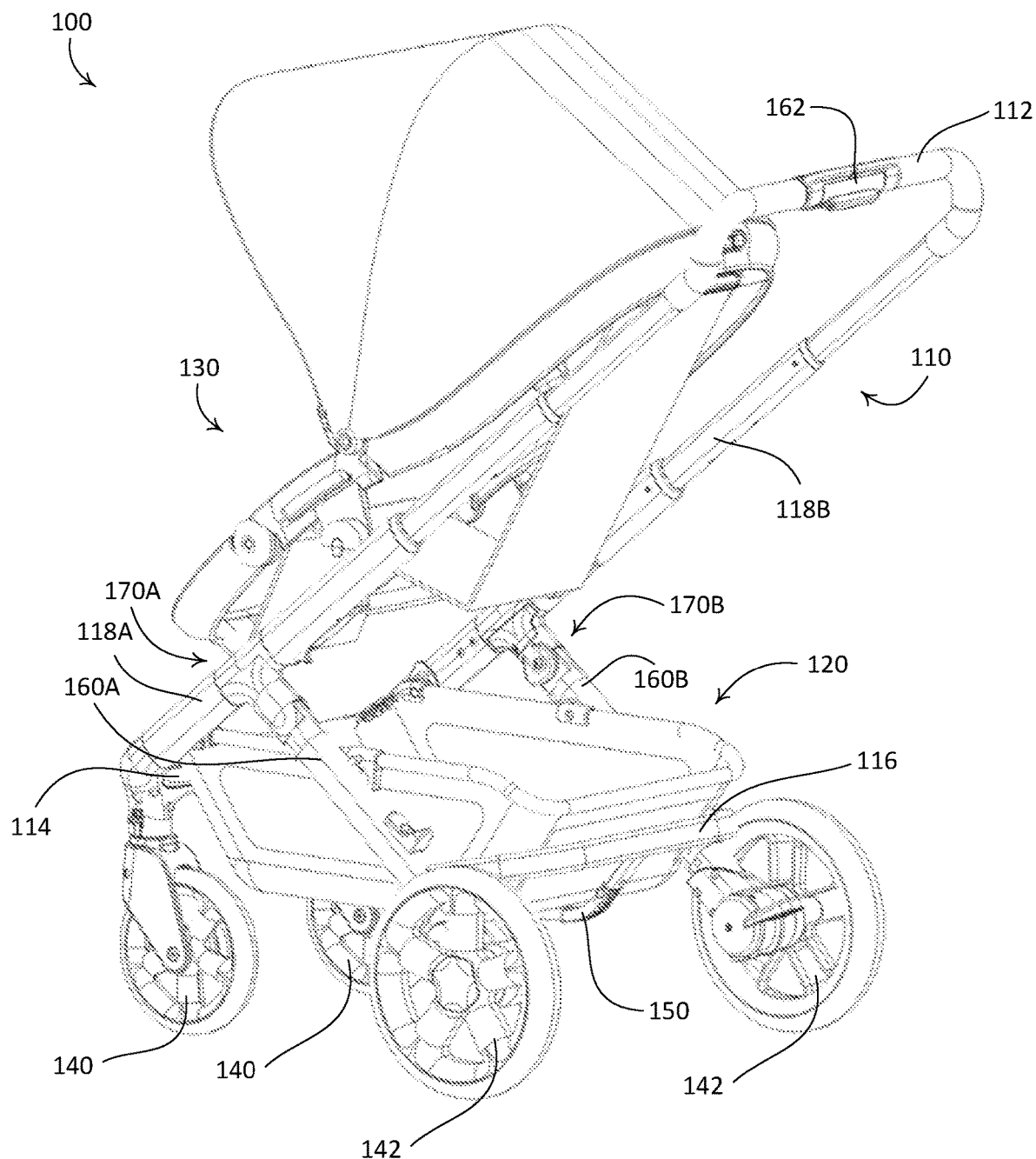
FIG. 1B is a rear isometric view of the example stroller assembly shown in FIG. 1A.
Figure 1C:
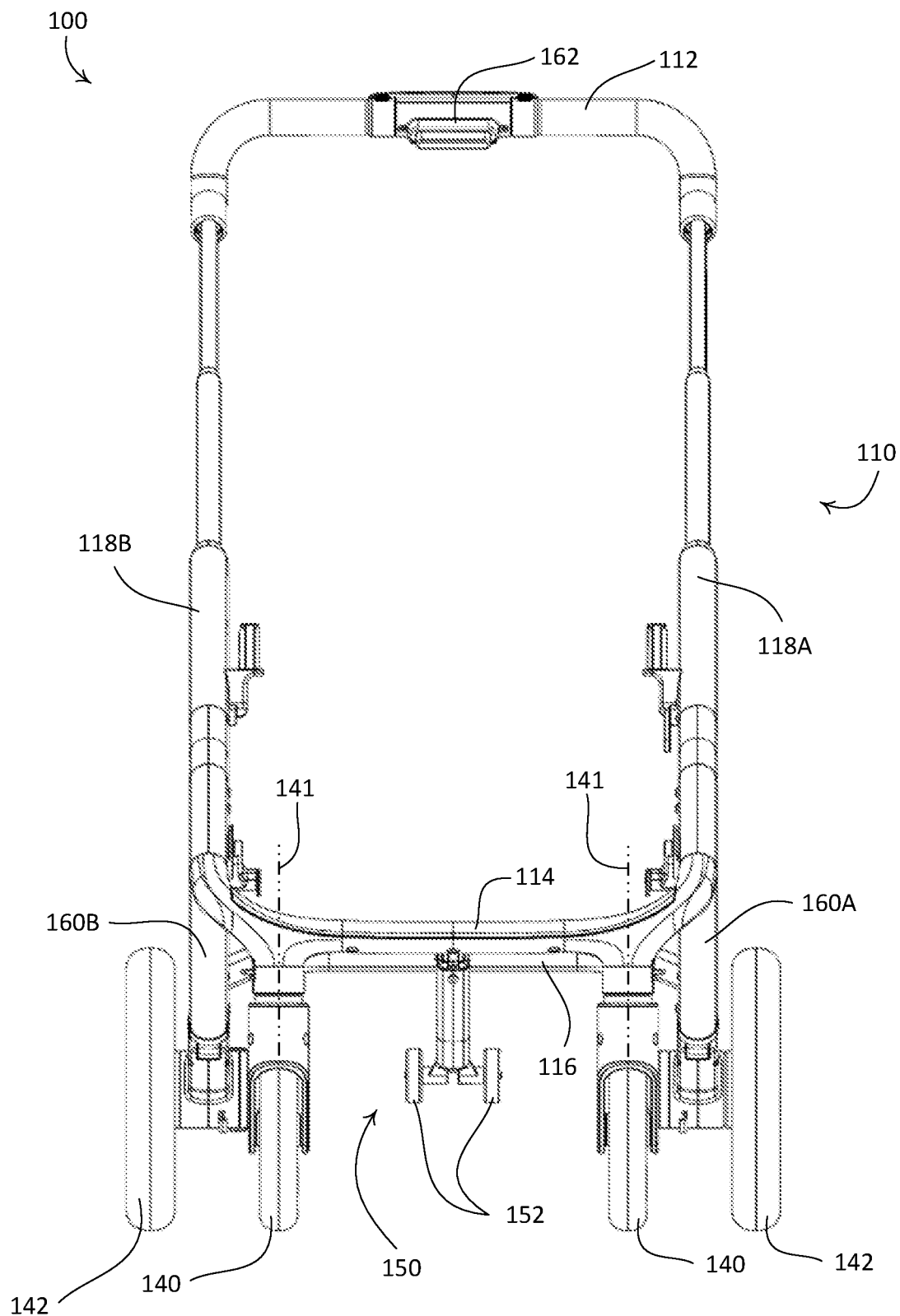
FIG. 1C is a front view of the example stroller assembly shown in FIG. 1A with the basket assembly and the seat assembly removed.
Figure 1D:
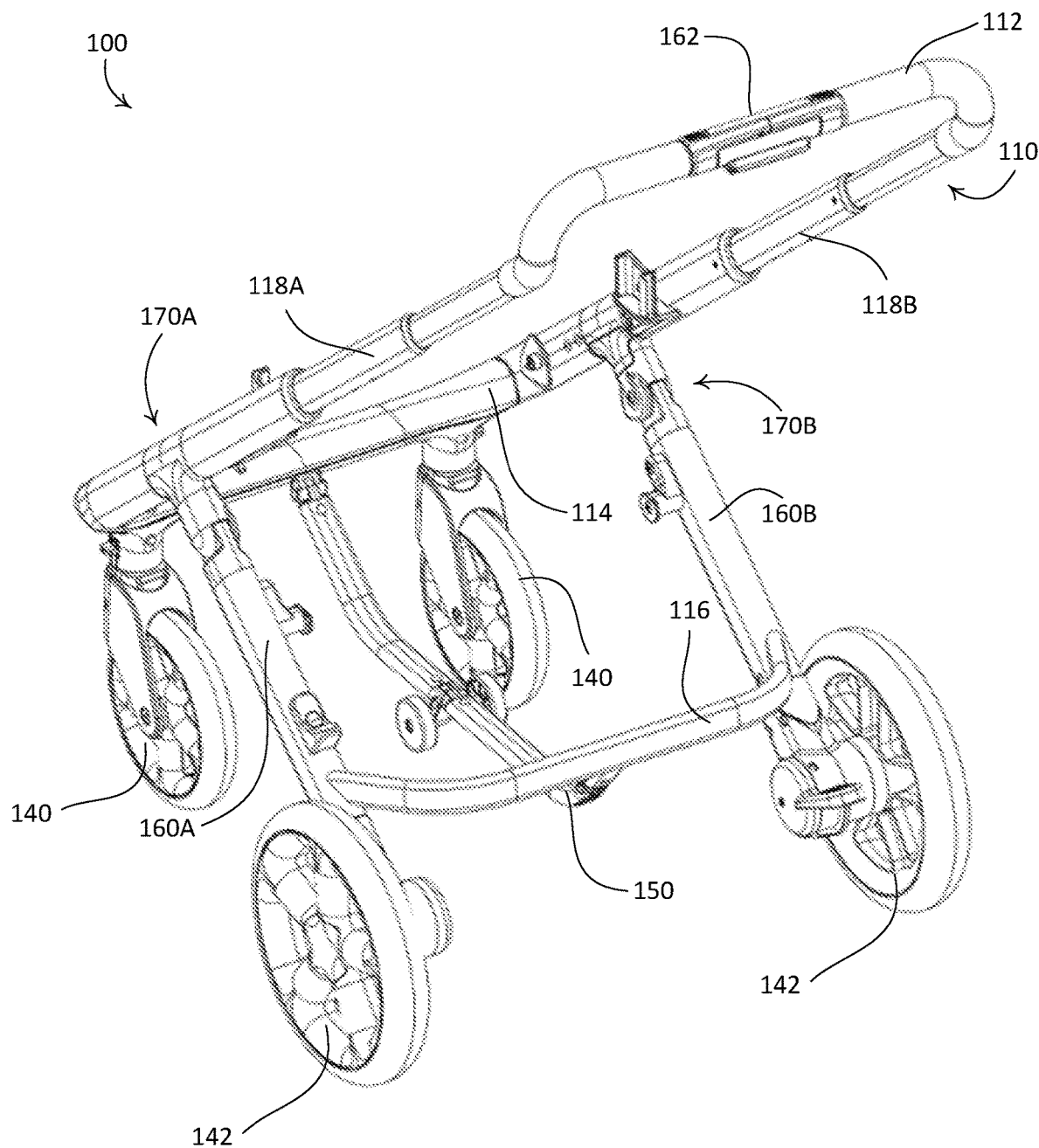
FIG. 1D is a rear isometric view of the example stroller assembly shown in FIG. 1A with the basket assembly and the seat assembly removed.

FIGS. 1A-1D depict an example stroller assembly 100. FIG. 1A is a front isometric view of the example stroller assembly 100. FIG. 1B is a rear isometric view of the example stroller assembly 100 shown in FIG. 1A. As shown in FIGS. 1A and 1B, the example stroller assembly 100 may include one or more of a stroller frame 110, a basket assembly 120, a seat assembly 130, a plurality of wheels 140, 142, or a support 150. FIG. 1C is a front view of the example stroller assembly 100 shown in FIG. 1A with the basket assembly 120 and the seat assembly 130 removed. FIG. 1D is a rear isometric view of the example stroller assembly 100 shown in FIG. 1A with the basket assembly 120 and the seat assembly 130 removed. The basket assembly 120 may be a storage assembly configured to receive items therein. For example, the basket assembly 120 may include a basket frame (e.g., storage assembly frame) and a basket (e.g., a storage compartment) that may be attached to the basket frame.

The stroller frame 110 may define an open position, for example, as shown in FIGS. 1A-1D. The open position may represent a child carrying position such that the seat assembly 130 is configured to accept a child when the stroller frame 110 is in the open position. The stroller frame 110 may define a collapsed position. The collapsed position may represent a folded position such that the seat assembly 130 cannot be used, but the basket assembly 120 is accessible. The stroller frame 110 may be supported by the plurality of wheels 140, 142 when in the open position. The plurality of wheels 140, 142 may be connected to the stroller frame 110.

The stroller frame 110 may be an assembly and may include a handlebar 112, a front horizontal bar 114, and a rear horizontal bar 116. The stroller frame 110 may include side bars 118A, 118B. The front horizontal bar 114 may be a bar that connects the side bars 118A, 118B. For example, the side bars 118A, 118B may connect the handlebar 112 to the front horizontal bar 114. The side bars 118A, 118B may be in a substantially vertical position when the stroller frame 110 is in the collapsed position. The stroller frame 110 may include rear legs 160A, 160B. Each of the rear legs 160A, 160B may attach to a respective side bar of the side bars 118A, 118B. For example, rear leg 160A may attach to side bar 118A and rear leg 160B may attach to the side bar 118B. The rear horizontal bar 116 may attach to each of the rear legs 160A, 160B.

The stroller frame 110 may include a handle 162. The handle 162 may be located along the handlebar 112. The handle 162 may be configured to operate the stroller frame 110 from an open position to a collapsed position (e.g., as shown in FIG. 2C). For example, the handle 162 may be configured to collapse the stroller frame 110 from the open position to the collapsed position. The handle 162 may be operably connected to one or more pivots 170A, 170B defined by the stroller frame 110. For example, the stroller frame 110 may include pivots 170A, 170B. The handle 162 may be configured to lock and/or unlock the pivots 170A, 170B such that the stroller frame 110 may be operated between the open position and the collapsed position. When the stroller frame 110 is in the open position and the pivots 170A, 170B are unlocked (e.g., via the handle 162), the rear legs 160A, 160B may rotate toward the front horizontal bar 114 and the handlebar 112 may move upward toward the front horizontal bar 114. The stroller frame 110 (e.g., the handlebar 112, the front horizontal bar 114, the rear horizontal bar 116, the side bars 118A, 118B, and/or the rear legs 160A, 160B, etc.) may be made from one or more materials, for example, such as a metallic material, a plastic material, a composite material, and/or the like.

The support 150 may be a part of the stroller frame 110. The support 150 may be referred to as a kickstand, a stand, a supporting stand, and/or the like. The support 150 may be configured to attach to the stroller frame 110. For example, the support 150 may attach at one or more locations on the stroller frame 110. The support 150 may attach to the front horizontal bar 114 and the rear horizontal bar 116. For example, the support 150 may attach at a midpoint of the front horizontal bar 114 and at a midpoint of the rear horizontal bar 116. The support 150 may be configured to be below the basket assembly 120 when the stroller frame 110 is in the open position. For example, the support 150 may be curved downward from the attachment at the front horizontal bar 114 and/or from the attachment at the rear horizontal bar 116. The support 150 may include one or more support wheels 152. The support 150 may be configured such that the support wheels 152 are distal from the ground when the stroller frame 110 is in the open position. For example, the support wheels 152 may not abut the ground when the stroller frame 110 is in the open position. The support 150 may be made from one or more materials, for example, such as a metallic material, a plastic material, a composite material, and/or the like.

The support 150 may be configured to be automatically deployed when the stroller frame 110 is operated (e.g., collapsed and/or closed) from the open position to a collapsed position (e.g., a partially collapsed position or a fully collapsed position). The support 150 may be configured to automatically retract when the stroller frame 110 is operated (e.g., unfolded and/or opened) from the collapsed position to the open position.

The plurality of wheels 140, 142 may be configured to abut the ground when the stroller frame 110 is in the open position. The wheels 140 may be front wheels. The wheels 140 may be configured such that steering of the stroller assembly 100 is enabled. For example, the wheels 140 may swivel around an attachment axis 141. The attachment axis 141 may be defined by the attachment of the wheels 140 to the stroller frame 110. The wheels 142 may be rear wheels. The wheels 142 may be configured to attach to the stroller frame 110 at the rear legs 160A, 160B. The wheels 140 may be configured to attach to the stroller frame 110 at the front horizontal bar 114.

The stroller frame 110 may be configured to adjust the height of the handlebar 112. The length of the side bars 118A, 118B may be adjustable. The side bars 118A, 118B may be retractable. For example, the side bars 118A, 118B may include portions (e.g., two or more) of varying size that telescope within one another. The seat assembly 130 may attach to the side bars 118A, 118B. For example, the seat assembly 130 may pivotally attach to the side bars 118A, 118B.

Although the stroller assembly 100 is shown as having one seat assembly 130, the stroller assembly 100 may include a plurality of seat assemblies. For example, the stroller assembly 100 may include a plurality of seat assemblies arranged next to each other and/or in front/behind one another.

Although the stroller frame 110 shown in FIGS. 1A-1D includes the rear horizontal bar 116, the stroller frame 110 may not include the rear horizontal bar 116. For example, the rear legs 160A, 160B may not be connected to one another. The support 150 may attach to the front horizontal bar 114 only, if the stroller frame 110 does not include the rear horizontal bar 116. Alternatively, the support 150 may attach to the front horizontal bar 114 and a portion of the basket assembly 120 (e.g., such as a frame of the basket assembly 120).

Although the stroller frame 110 shown in FIGS. 1A-1D includes the front horizontal bar 114, the stroller frame 110 may not include the front horizontal bar 114. Alternatively, the front horizontal bar 114 may not be horizontal. For example, the side bars 118A, 118B may not be connected to one another. Alternatively, the side bars 118A, 118B may be connected by a bar that is not horizontal. The support 150 may attach to the rear horizontal bar 116 only, if the stroller frame 110 does not include the front horizontal bar 114. Alternatively, the support 150 may attach to the rear horizontal bar 116 and a portion of the basket assembly 120 (e.g., such as a frame of the basket assembly 120).

Figure 2A:
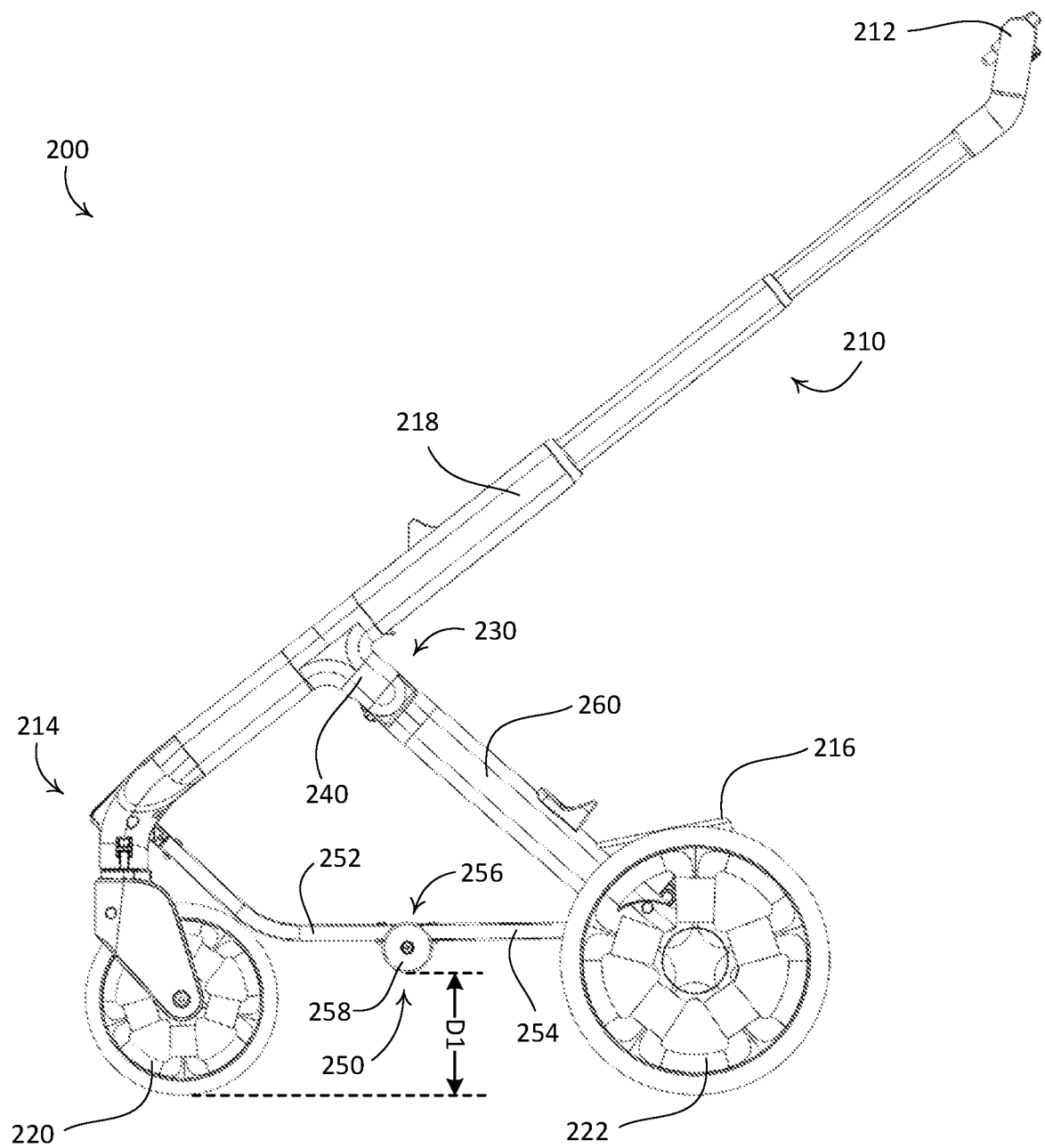
FIG. 2A is a side view of an example stroller assembly in an open position.
Figure 2B:
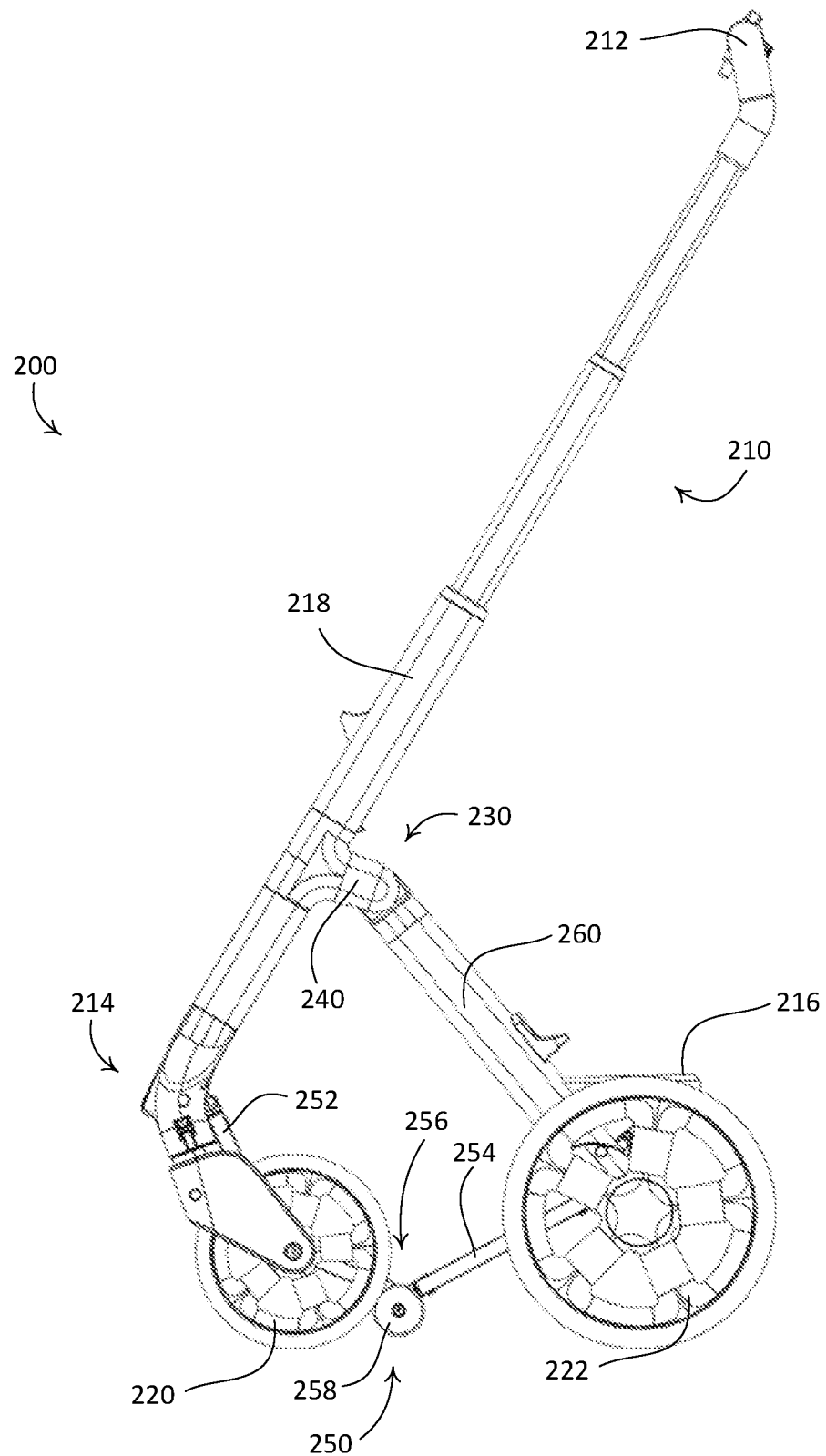
FIG. 2B is a side view of the example stroller assembly shown in FIG. 2A in an intermediate position.
Figure 2C:
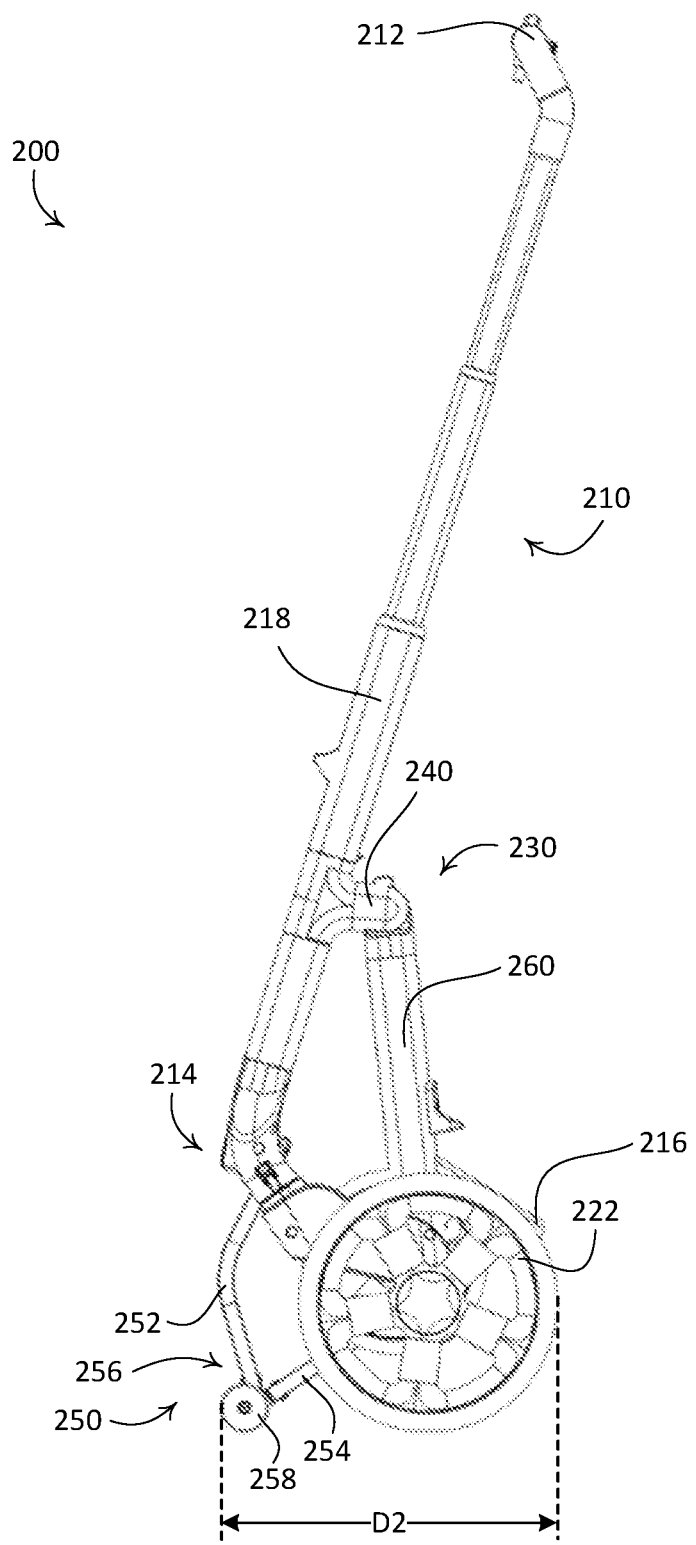
FIG. 2C is a side view of the example stroller assembly shown in FIG. 2A in a collapsed position.

FIG. 2A-2C are side views of an example stroller assembly 200 (e.g., such as the stroller assembly 100 shown in FIGS. 1A-1D) as the stroller assembly 200 is operated between an open position and a collapsed position. For example, the stroller assembly 200 may be configured to be collapsed from the open position to the collapsed position. As another example, the stroller assembly 200 may be configured to be opened from the collapsed position to the open position. The example stroller assembly 200 may include a stroller frame 210 (e.g., such as the stroller frame 110); a plurality of wheels 220, 222; and a support 250. The stroller frame 210 may be configured to be operated between the open position, for example, as shown in FIG. 2A; the intermediate position, for example, as shown in FIG. 2B; and the collapsed position, for example, as shown in FIG.

2C. The intermediate position may be defined as a position between the open position and the collapsed position.

The stroller frame 210 may include a handlebar 212, a front horizontal bar 214, a rear horizontal bar 216, side bars 218, rear legs 260, and pivot joints 230. The side bars 218 may connect the handlebar 212 to the front horizontal bar 214. For example, a first end of the side bars 218 may attach to the handlebar 212 and a second end of the side bars 218 may connect to the front horizontal bar 214. Each of the rear legs 260 may attach to a respective side bar of the side bars 218. For example, the stroller frame 210 may define a pivot joint 230 where the rear leg 260 attaches to the side bar 218. The rear horizontal bar 216 may attach to the rear legs 260. For example, a first end of the rear horizontal bar 216 may attach to a first rear leg of the rear legs 260 and a second end of the rear horizontal bar 216 may attach to a second leg of the rear legs 260. The rear horizontal bar 216 may be curved such that the rear horizontal bar 216 extends away from the rear legs 260 in a direction opposed from the front horizontal bar 214. The rear horizontal bar 216 may be curved, for example, to receive a basket assembly (e.g., such as the basket assembly 120 shown in FIGS. 1A and 1B).

The plurality of wheels 220, 222 may include one or more front wheels 220 and one or more rear wheels 222. When the stroller frame 210 is in the open position, the stroller assembly 200 may be supported by the plurality of wheels 220, 222.

The pivot joints 230 may be configured to enable operation of the stroller frame 210 between the open position and the collapsed position. The pivot joints 230 may define the attachment of the rear legs 260 to the side bars 218. For example, the rear legs 260 may attach to the side bars 218 via the pivot joints 230. The stroller frame 210 may include rear leg connectors 240. The rear leg connectors 240 may extend from the side bars 218. The rear legs 260 may attach to the side bars 218 via the rear leg connectors 240. For example, the rear legs 260 may attach to the rear leg connectors 240. The rear legs 260 may attach to the rear leg connectors 240 via the pivot joint 230. For example, the rear leg connectors 240 may include the pivot joints 230. The rear legs 260 may pivot at the pivot joints 230 when the stroller frame 210 is operated between the open position and the collapsed position.

The rear legs 260 may be configured to lock in a first position when the stroller frame 210 is in the open position. The rear legs 260 may be configured to lock in a second position when the stroller frame 210 is in the collapsed position. For example, the stroller frame 210 may include a lock (not shown) that is configured to lock the rear legs 260 in the first position and/or the second position. As another example, the stroller frame 210 may include a first lock for the first position and a second lock for the second position. The lock may be actuated via the handle 262. For example, the handle 262 may be operably connected to the lock and/or the pivot joints 230. When the handle 262 is actuated, the lock may be released. When the lock is released, the rear legs 260 may pivot such that the stroller frame 210 is operable between the open position and the collapsed position.

The support 250 may include a first arm 252, a second arm 254, a joint 256, and one or more support wheels 258. The support 250 may be configured to attach to the stroller frame 210 (e.g., at one or more locations on the stroller frame 210). For example, the first arm 252 and the second arm 254 may attach to the stroller frame 210. The first arm 252 may be configured to attach to the front horizontal bar 214. For example, the first arm 252 may pivotally connect to the front horizontal bar 214. The first arm 252 may pivot with respect to the front horizontal bar 214. The second arm 254 may be configured to attach to the rear horizontal bar 216. For example, the second arm 254 may pivotally connect to the rear horizontal bar 216. The second arm 254 may pivot with respect to the rear horizontal bar 216. The first arm 252 may attach to the second arm 254. For example, the first arm 252 and the second arm 254 may connect at a joint 256. The first arm 252 may be configured to rotate about the joint 256 toward the second arm 254 when the stroller frame 210 is operated between the open position and the collapsed position. The joint 256 may be a revolute joint having a pin (e.g., such as the pin 336 shown in FIG. 3B) that extends through the joint 256. The first arm 252 and the second arm 254 may rotate about the pin. When the first arm 252 rotates toward the second arm 254, the support wheel(s) 258 may contact the ground (e.g., when the stroller frame 210 is in the collapsed position).

The support 250 may be configured to support the stroller assembly 200 in a substantially vertical position when the stroller frame 210 is in the collapsed position. The support 250 may be configured to support the stroller assembly 200 and enable access to a storage compartment (e.g., such as the basket assembly 120 shown in FIGS. 1A and 1B). The support wheel(s) 258 may be configured such that the stroller assembly 200 can be pushed or pulled when the stroller frame 210 is in the collapsed position. The support wheel(s) 258 and the rear wheels 222 may be configured to balance the stroller assembly 200 in a substantially vertical position (e.g., as shown in FIG. 2C) when the stroller frame 210 is in the collapsed position. For example, the support wheel(s) 258 may engage the ground and the front wheels 220 may be raised off the ground when the stroller frame 210 is in the collapsed position. The center of gravity of the stroller assembly 200 may be located between the support wheel(s) 258 and the rear wheels 222 when the stroller frame 210 is in the collapsed position. The stroller assembly 200 may be configured to be pushed and/or pulled when the stroller frame 210 is in the collapsed position. For example, the support wheel(s) 258 and the rear wheels 222 may be configured to rotate when a force is applied to the stroller frame 210 (e.g., such as the handlebar 212) in the collapsed position.

The support 250 may be configured to be automatically deployed when the stroller frame 210 is operated (e.g., collapsed and/or closed) from the open position to the collapsed position (e.g., a partially collapsed position or a fully collapsed position). The support 250 may be configured to automatically retract when the stroller frame 210 is operated (e.g., unfolded and/or opened) from the collapsed position to the open position.

As shown in FIG. 2A, one or more of the following may apply when the stroller frame 210 is in the open position. The rear legs 260 may be locked in the first position. For example, the pivot joints 230 may be configured to lock the rear legs 260 in the first position. The support 250 may be positioned below the basket assembly (not shown). The support wheel(s) 258 of the support 250 may not abut the ground. The support wheel(s) 258 of the support 250 may be spaced from the ground, for example, by a distance D1. The distance D1 may be configured such that ground clearance is maintained beneath the support 250. The distance D1 may be in the range of 2 in to 12 in. In an example, the distance D1 may be approximately 5.5 in.

As shown in FIG. 2B, one or more of the following may apply when the stroller frame 210 is in the intermediate position. The rear legs 260 may be unlocked and in a pivoting position. For example, the rear legs 260 may pivot towards the front horizontal bar 214. The support 250 may pivot at the joint 256 such that the first arm 252 pivots toward the second arm 254. The joint 256 may move downwards toward the ground such that the support wheel(s) 258 move toward the ground. For example, the support wheel(s) 258 may not abut the ground when the stroller frame 210 is in the intermediate position. The handlebar 212 may move upwards toward the substantially vertical position.

As shown in FIG. 2C, one or more of the following may apply when the stroller frame 210 is in the collapsed position. The rear legs 260 may be locked in the second position. The support 250 may be bent such that the support wheel(s) 258 abuts the ground. The support wheel(s) 258 of the support 250 may be spaced from the rear wheels 222, for example, by a distance D2. The distance D2 may be configured such that the stroller assembly 200 is stable (e.g., the center of gravity of the stroller assembly 200 is near the midpoint of the distance D2) when the stroller frame 210 is in the collapsed position. For example, the distance D2 may be in the range of 8 in to 24 in. In an example, the distance D2 may be approximately 16.5 in. The support 250 may be configured to optimize (e.g., minimize) the distance D2 while maintaining the stability of the stroller assembly 200 in the substantially vertical position. For example, the location of the joint 256, a length of the first arm 252, and/or a length of the second arm 254 may be determined such that the support wheel(s) 258 of the support 250 contact the ground when the stroller frame 210 is in the collapsed position and such that the support 250 is below the storage compartment when the stroller frame 210 is in the open position. The location of the joint 256, the length of the first arm 252, and/or the length of the second arm 254 may be determined based on the distance D2. The distance D2 may be determined based on a distance between the front horizontal bar 214 and the rear horizontal bar 216 when the stroller frame 210 is in the open position. The distance D2 may be determined based on a distance between the front wheels 220 and the rear wheels 222. The handlebar 212 may be accessed to enable a user to move the stroller assembly 200 when the stroller frame 210 is in the collapsed position.

FIGS. 3A-3E depict an example support 300 for a stroller assembly (e.g., such as the stroller assembly 100 shown in FIGS. 1A-1D and/or the stroller assembly 200 shown in FIGS. 2A-2C). The support 300 may include a first arm 310, a second arm 320, a joint 330, and support wheels 340A, 340B. The support 300 may include a first arm connector 312 and a second arm connector 314. The joint 330 may include a female portion 332, a male portion 334, and a pin 336. The female portion 332 may receive the male portion 334. For example, the male portion 334 of the joint 330 may extend into the female portion 332 of the joint 330. The female portion 332 may be configured to rotate around the pin 336 such that the first arm 310 moves toward the second arm 320 as the stroller assembly 200 is collapsed. The pin 336 may extend through the female portion 332 and the male portion 334. For example, the female portion 332 may define holes 333 and the male portion 334 may define a hole 335. The holes 333, 335 may be configured to receive the pin 336. The pin 336 may be a rivet. The pin 336 may connect the female portion 332 to the male portion 334 using a rivet washer 337.

The first arm 310 may be a hollow tube. Alternatively, the first arm 310 may be a solid member that defines bores at respective ends of the first arm 310. The first arm 310 may be configured to receive the female portion 332. For example, a part of the female portion 332 may extend into the first arm 310. The first arm 310 and the female portion 332 may be connected using a fastener 322B and/or a washer 323B. The first arm 310 may receive the first arm connector 312. For example, a part of the first arm connector 312 may extend into the first arm 310. The first arm 310 and the first arm connector 312 may be connected using a fastener 322A and/or a washer 323A.

The second arm 320 may be a hollow tube. Alternatively, the second arm 320 may be a solid member that defines bores at respective ends of the second arm 320. The second arm 320 may be configured to receive the male portion 334. For example, a part of the male portion 334 may extend into the second arm 320. The second arm 320 and the male portion 334 may be connected using a fastener 322C and/or a washer 323C. The second arm 320 may receive the second arm connector 314. For example, the second arm connector 314 may extend into the second arm 320. The second arm 320 and the second arm connector 314 may be connected using a fastener 322D and/or a washer 323D. The fasteners 322A, 322B, 322C, 322D may be the size and/or style of fastener. For example, the fasteners 322A, 322B, 322C, 322D may be rivets, screws, bolts, and/or another type of fastener.

The support wheels 340A, 340B may attach to the female portion 332 of the joint 330. For example, the female portion 332 may define an extension 338 having an axis 342. The extension 338 may extend below the first arm 310 and the second arm 320 such that the axis 342 is below the first arm 310 and the second arm 320. The support wheels 340A, 340B may attach to the axis 342, for example, via fasteners 344. The fasteners 344 may be any type of fastener such as rivets, screws, or bolts, for example. The extension 338 may be configured such that the support wheels 340A, 340B engage the ground when the stroller assembly is in the collapsed position.

The first arm 310 and the second arm connector 314 may be curved, for example, such that the support 300 is below a basket assembly (e.g., a lower storage compartment) of the stroller assembly.

FIGS. 3C-3E depict the example support 300 as the stroller assembly is operated between an open position and a collapsed position. For example, FIG. 3A depicts the example support 300 when the stroller assembly is in the open position (e.g., such as the open position shown in FIG. 2A); FIG. 3B depicts the example support 300 when the stroller assembly is in an intermediate position (e.g., such as the intermediate position shown in FIG. 2B); and FIG. 3C depicts the example support 300 when the stroller assembly is in the collapsed position (e.g., such as the collapsed position shown in FIG. 2C).

The support 300 may be configured to be automatically deployed when the stroller assembly is operated (e.g., collapsed and/or closed) from the open position to a collapsed position (e.g., a partially collapsed position or a fully collapsed position). The support 300 may be configured to automatically retract when the stroller assembly is operated (e.g., unfolded and/or opened) from the collapsed position to the open position.

As shown in FIG. 3C, one or more of the following may apply when the stroller assembly is in the open position. The first arm 310 may be aligned with the second arm 320. For example, a part of the first arm 310 that attaches to the joint 330 may be substantially horizontal and/or may be parallel with the second arm 320.

As shown in FIG. 3D, one or more of the following may apply when the stroller assembly is in the intermediate position. The first arm 310 and the second arm 320 may be pivoted toward each other. For example, the first arm 310 may pivot toward the second arm 320. The first arm 310 and the second arm 320 may pivot about the joint 330 such that the axis 342 is moved downward, for example, toward the ground. The support 300 is shown in FIG. 3D with the support wheels 340A, 340B removed.

As shown in FIG. 3E, one or more of the following may apply when the stroller assembly is in the collapsed position. The first arm 310 and the second arm 320 may be pivoted further toward each other. For example, the first arm 310 may pivot toward the second arm 320 such that the respective ends connecting to the joint 330 are proximate to each other. The support 300 is shown in FIG. 3E with the support wheels 340A, 340B removed. The axis 342 may be moved further downward, for example, such that the support wheels 340A, 340B abut the ground. The support wheels 340A, 340B may be configured to support (e.g., partially support) the stroller assembly in the collapsed position.

Figure 4A:
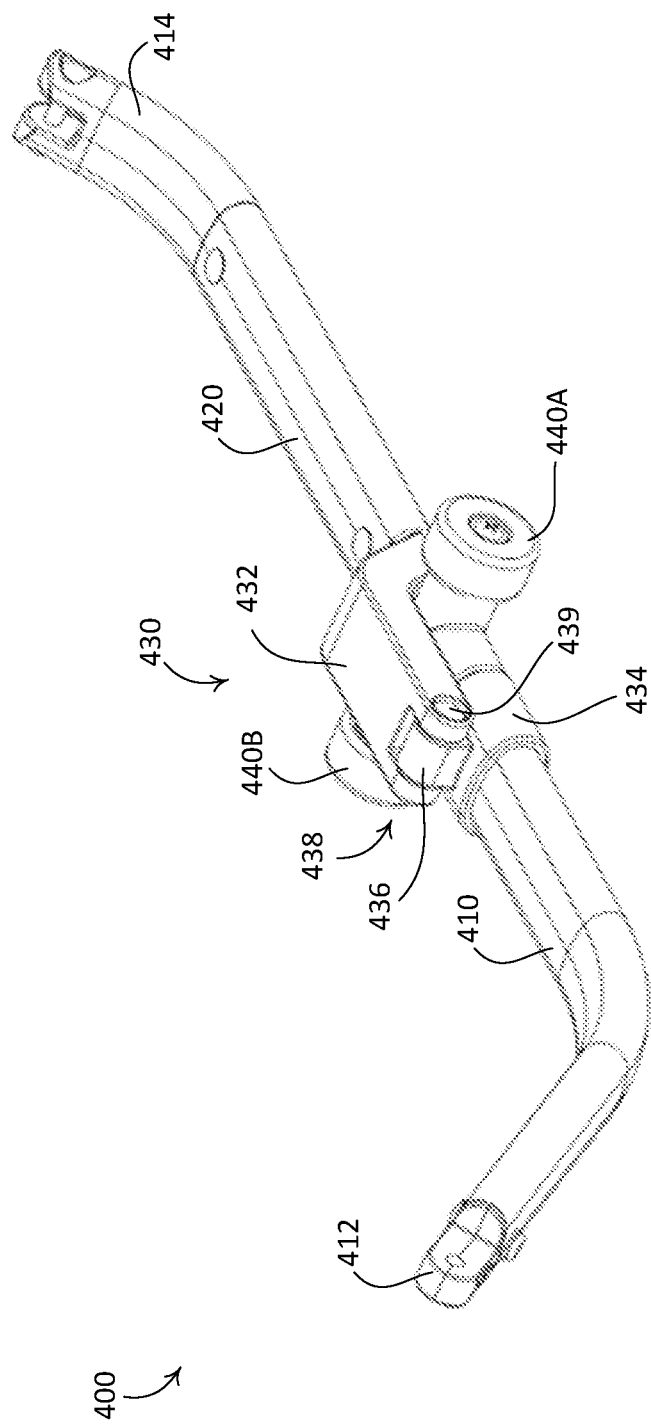
FIG. 4A is an isometric view of another example support for a stroller assembly.
Figure 4C:
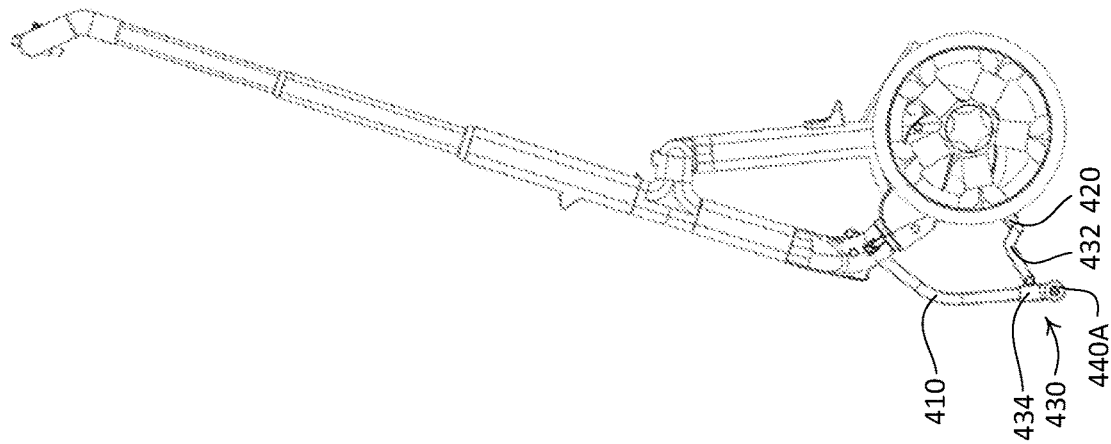
FIG. 4C is a side view of an example stroller assembly with the example support shown in FIG. 4A when the stroller assembly is in a collapsed position.
Figure 4B:
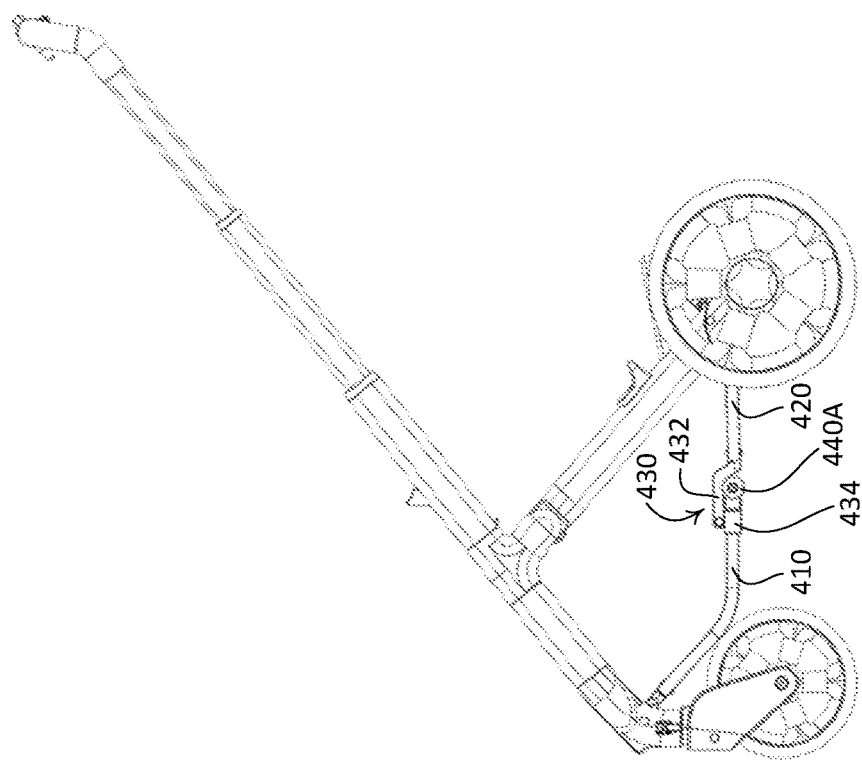
FIG. 4B is a side view of an example stroller assembly with the example support shown in FIG. 4A when the stroller assembly is in an open position.

FIGS. 4A-4C depict an example support 400 for a stroller assembly (e.g., such as the stroller assembly 100 shown in FIGS. 1A-1D and/or the stroller assembly 200 shown in FIGS. 2A-2C). The support 400 may include a first arm 410, a second arm 420, a joint 430, and support wheels 440A, 440B. The joint 430 may include a linkage 432 connected to a sleeve 434. The sleeve 434 may be operably coupled to the first arm 410. The sleeve 434 may be configured to receive the first arm 410. For example, the sleeve 434 may be configured to slidingly operate along the first arm 410 as the stroller assembly is operated between an open position and a collapsed position. The linkage 432 may be connected to the second arm 420. The second arm 420 may receive a portion of the linkage 432. For example, the portion of the linkage 432 may extend into the second arm 420. The linkage 432 and the second arm 420 may be connected using a fastener (not shown) and/or a washer (not shown). The fastener may be any type of fastener such as rivets, screws, or bolts, for example.

The joint 430 may include an extension 436 that extends from the sleeve 434. The extension 436 may be configured to attach to the linkage 432. For example, the extension 436 may attach to the linkage 432 via a joint 438 (e.g., a revolute joint). The joint 438 may include a pin 439 that extends through the linkage 432 and the extension 436. The linkage 432 may be configured to pivot about the joint 438 as the stroller assembly is operated between an open position and a collapsed position. The support wheels 440A, 440B may be connected to the first arm 410. The first arm 410 may be a hollow or solid tube (e.g., a hollow aluminum tube). The second arm 420 may be a hollow or solid tube (e.g., a hollow aluminum tube). The first arm 410, the second arm 420, and/or the joint 430 may be made from one or more materials, for example, such as a metallic material, a plastic material, a composite material, and/or the like.

FIGS. 4B and 4C depict the example support 400 as the stroller assembly is operated between an open position and a collapsed position. For example, FIG. 4B depicts the example support 400 when the stroller assembly is in the open position (e.g., such as the open position shown in FIG. 2A) and FIG. 4C depicts the example support 400 when the stroller assembly is in the collapsed position (e.g., such as the collapsed position shown in FIG. 2C).

The support 400 may be configured to be automatically deployed when the stroller assembly is operated (e.g., collapsed and/or closed) from the open position to a collapsed position (e.g., a partially collapsed position or a fully collapsed position). The support 400 may be configured to automatically retract when the stroller assembly is operated (e.g., unfolded and/or opened) from the collapsed position to the open position.

As shown in FIG. 4B, one or more of the following may apply when the stroller assembly is in the open position. The first arm 410 may be aligned with the second arm 420. For example, a part of the first arm 410 that attaches to the joint 430 may be substantially horizontal and/or may be parallel with the second arm 420.

As shown in FIG. 4C, one or more of the following may apply when the stroller assembly is in the collapsed position. The first arm 410 and the second arm 420 may be pivoted toward each other. For example, the first arm 410 may pivot toward the second arm 420 such that the sleeve 434 slidingly operates along the first arm 410. The support wheels 440A, 440B may abut the ground and may be configured such that the stroller assembly can be supported (e.g., partially supported) by the support wheels 440A, 440B.

FIGS. 5A-5D depict an example support 500 for a stroller assembly (e.g., such as the stroller assembly 100 shown in FIGS. 1A-1D and/or the stroller assembly 200 shown in FIGS. 2A-2C). The support 500 may include a first arm 510, one or more second arms 520A, 520B, a joint 530, and support wheels 540A, 540B. The joint 530 may include a linkage 532 connected to one or more sleeves 534A, 534B. Each of the sleeves 534A, 534B may be configured to receive a respective second arm of the one or more second arms 520A, 520B. For example, the sleeve 534A may receive the second arm 520A and the sleeve 534B may receive the second arm 520B. The sleeves 534A, 534B may be configured to slidingly operate along the second arms 520A, 520B as the stroller assembly is operated between an open position and a collapsed position. The linkage 532 may be connected to the first arm 510. For example, the linkage 532 may attach to the first arm 510 via a pin joint 538. The pin joint 538 may be a revolute joint and/or a hinge joint. The pin joint 538 may include a pin (e.g., the linkage 532) that extends through a coupling 536. The coupling 536 may be attached to the first arm 510. The support wheels 540A, 540B may be connected to respective second arms 520A, 520B. The second arms 520A, 520B may be attached to respective rear connectors 514A, 514B, for example, such that the support 500 attaches to the stroller assembly. The first arm 510 may be attached to a front connector 512, for example, such that the support 500 attaches to the stroller assembly.

The first arm 510 may be a hollow or solid tube (e.g., a hollow aluminum tube). The second arms 520A, 520B may be a hollow or solid tube (e.g., a hollow aluminum tube). The first arm 510, the second arms 520A, 520B, and/or the joint 530 may be made from one or more materials, for example, such as a metallic material, a plastic material, a composite material, and/or the like.

Figure 5D:
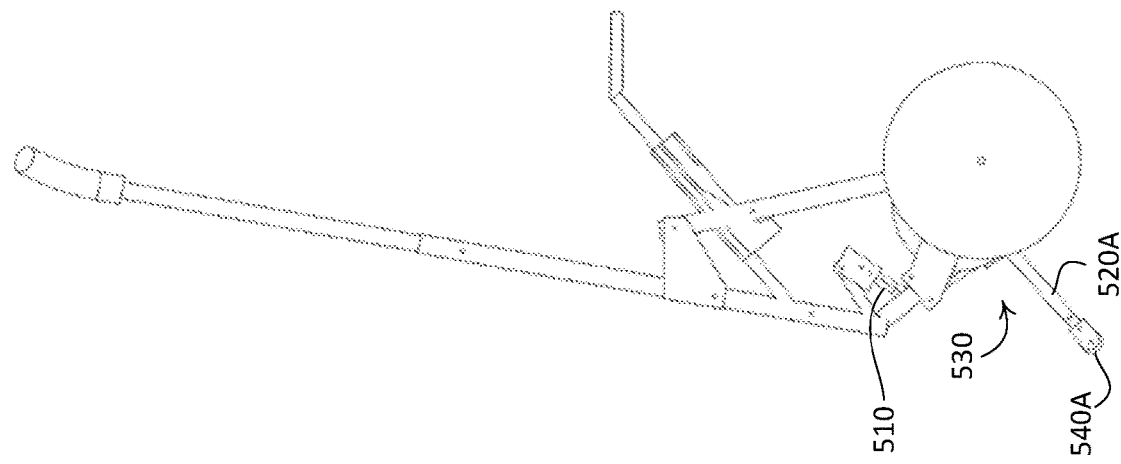
FIG. 5D is a side view of an example stroller assembly with the example support shown in FIG. 5A when the stroller assembly is in a collapsed position.
Figure 5C:
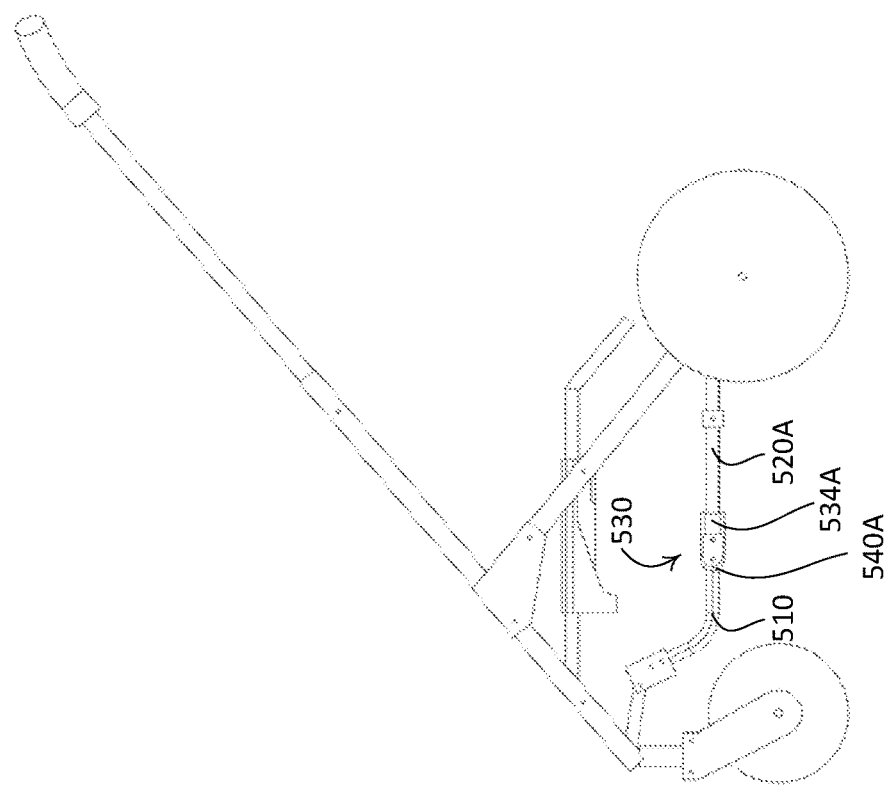
FIG. 5C is a side view of an example stroller assembly with the example support shown in FIG. 5A when the stroller assembly is in an open position.

FIGS. 5C-5D depict the example support 500 as the stroller assembly is operated between an open position and a collapsed position. For example, FIG. 5C depicts the example support 500 when the stroller assembly is in the open position (e.g., such as the open position shown in FIG. 2A) and FIG. 5D depicts the example support 500 when the stroller assembly is in the collapsed position (e.g., such as the collapsed position shown in FIG. 2C).

The support 500 may be configured to be automatically deployed when the stroller assembly is operated (e.g., collapsed and/or closed) from the open position to a collapsed position (e.g., a partially collapsed position or a fully collapsed position). The support 500 may be configured to automatically retract when the stroller assembly is operated (e.g., unfolded and/or opened) from the collapsed position to the open position.

As shown in FIG. 5C, one or more of the following may apply when the stroller assembly is in the open position. The first arm 510 may be aligned with the second arms 520A, 520B. For example, a part of the first arm 510 that attaches to the joint 530 may be substantially horizontal and/or may be parallel with the second arms 520A, 520B.

As shown in FIG. 5D, one or more of the following may apply when the stroller assembly is in the collapsed position. The first arm 510 and the second arms 520A, 520B may be pivoted toward each other. For example, the first arm 510 may pivot toward the second arms 520A, 520B such that the sleeves 534A, 534B slidingly operate along the respective second arms 520A, 520B. The support wheels 540A, 540B may abut the ground and may be configured such that the stroller assembly can be supported (e.g., partially supported) by the support wheels 540A, 540B.

Although the stroller assemblies shown in the figures include one support, those skilled in the art would appreciate that the stroller assembly may include two or more supports. Each of the two or more supports may include a support wheel. The two or more supports may be configured to support (e.g., balance and/or maintain) the stroller assembly in the collapsed position.

Although the stroller assemblies shown in the figures depict the rear wheel(s) supporting the stroller assembly in the collapsed position, those skilled in the art would appreciate that the front wheel(s) may support the stroller assembly in the collapsed position. For example, the stroller assembly may be configured such that the front wheel(s) contact the ground and the rear wheel(s) do not contact the ground when the stroller assembly is in the collapsed position.

Although the stroller assemblies shown in the figures depict the support having wheel(s), those skilled in the art would appreciate that the support may include other components that may support the stroller assembly in the collapsed position and/or allow the stroller assembly to be pushed or pulled when in a substantially vertical position. For example, the support may include one or more of a sphere, a ball, a sled, and/or the like.

Figure 6A:
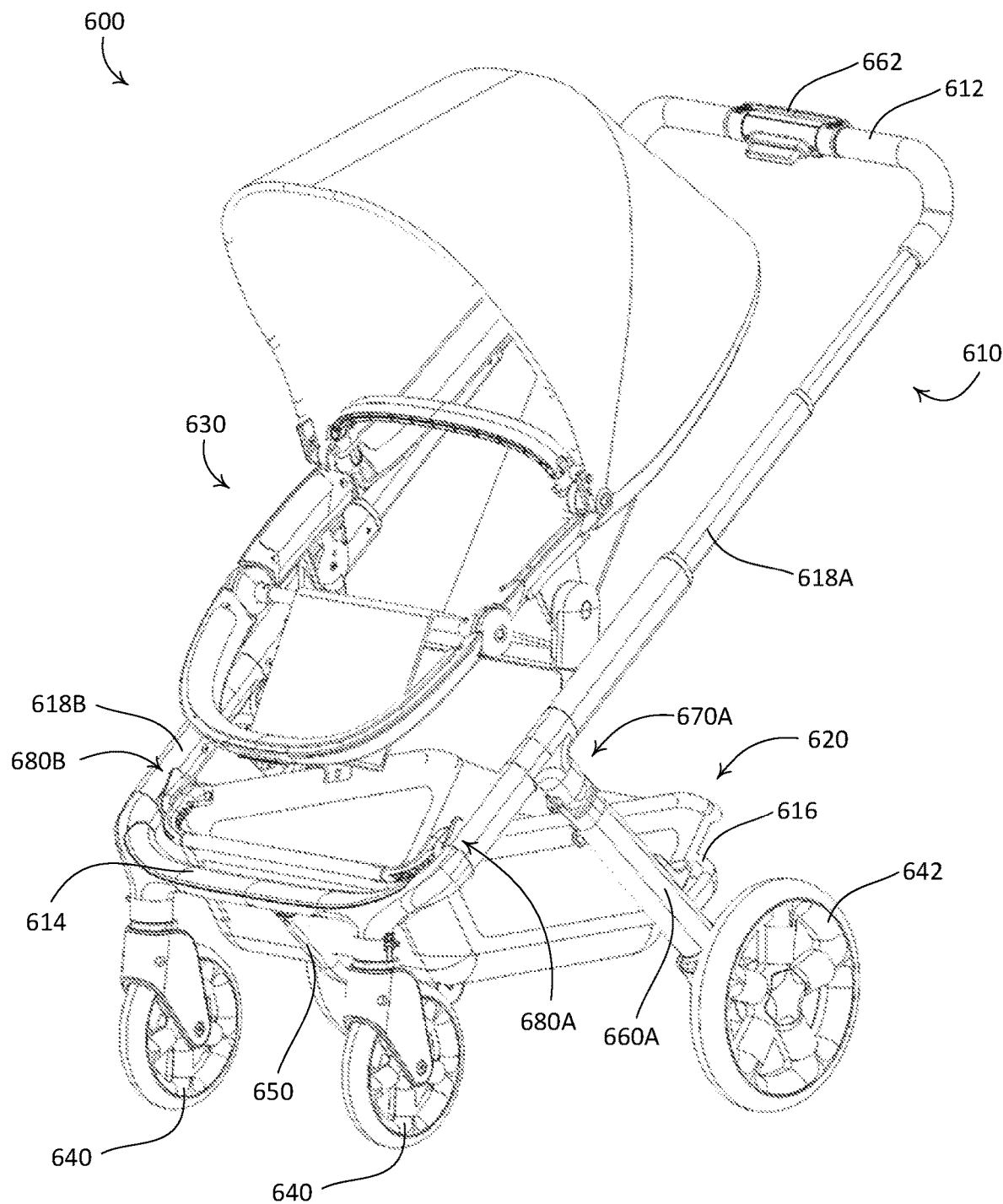
FIG. 6A is a front isometric view of an example stroller assembly.
Figure 6B:
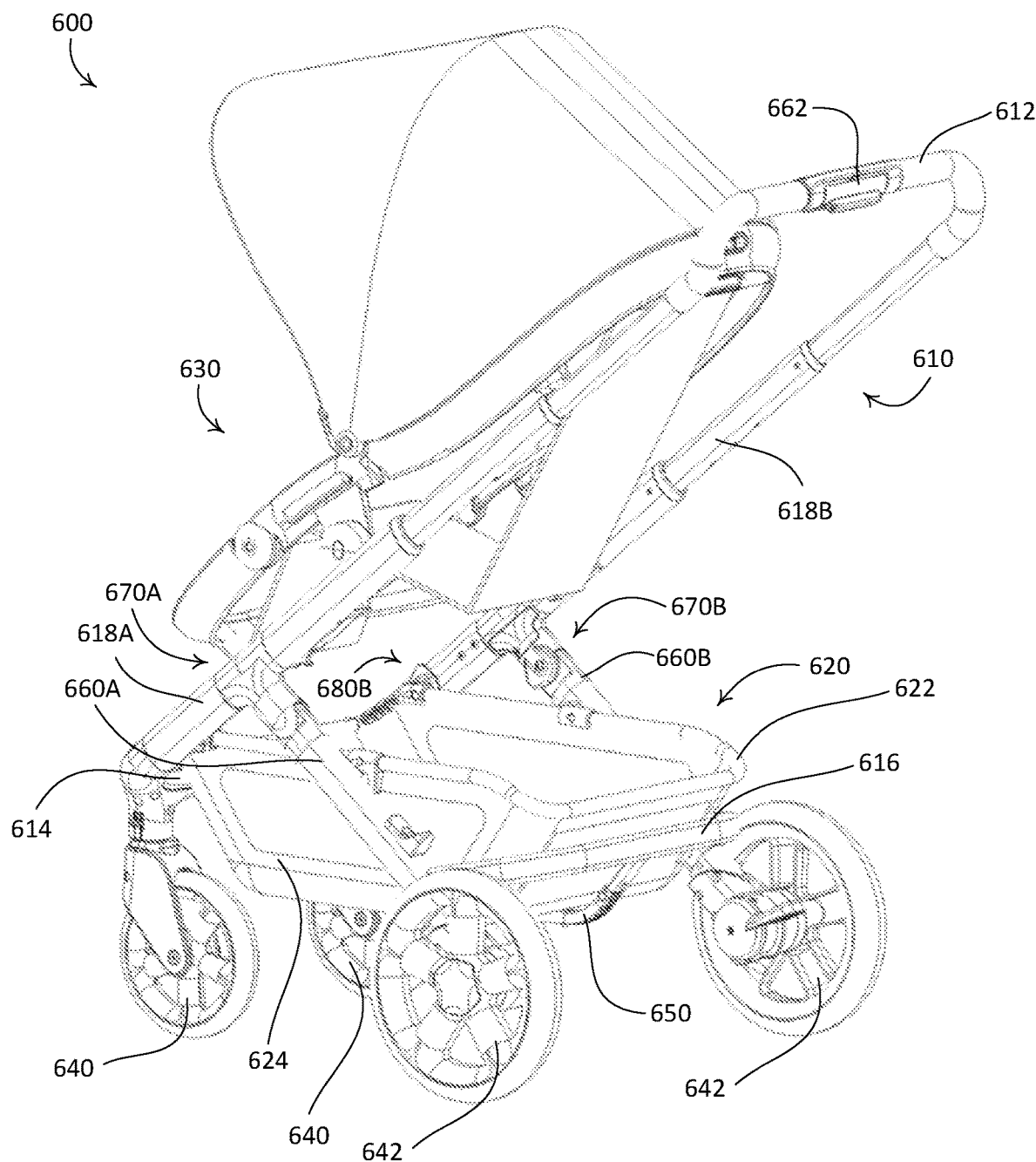
FIG. 6B is a rear isometric view of the example stroller assembly shown in FIG. 6A.
Figure 6C:
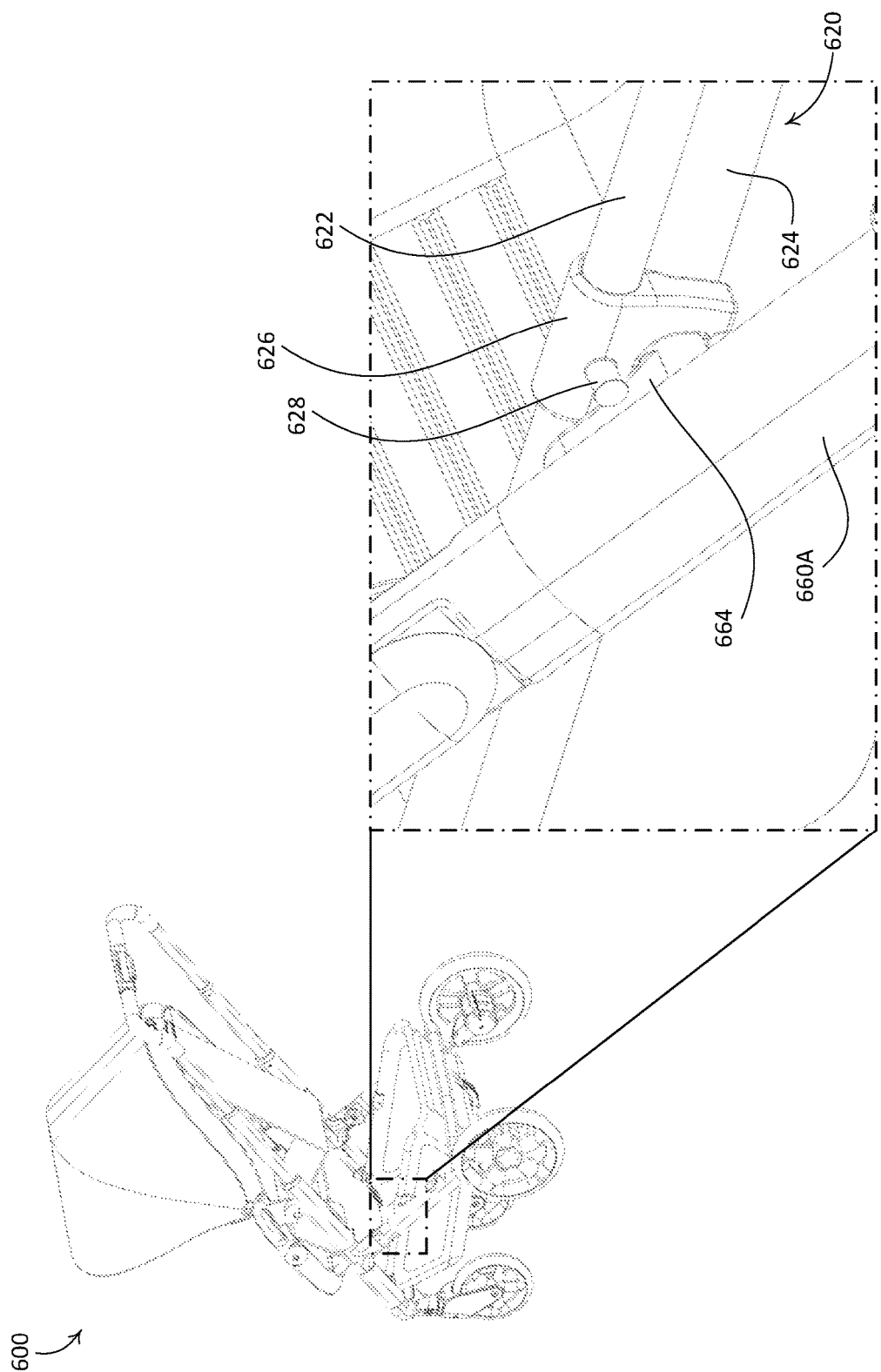
FIG. 6C is a detail view of the example stroller assembly shown in FIG. 6A.
Figure 6D:
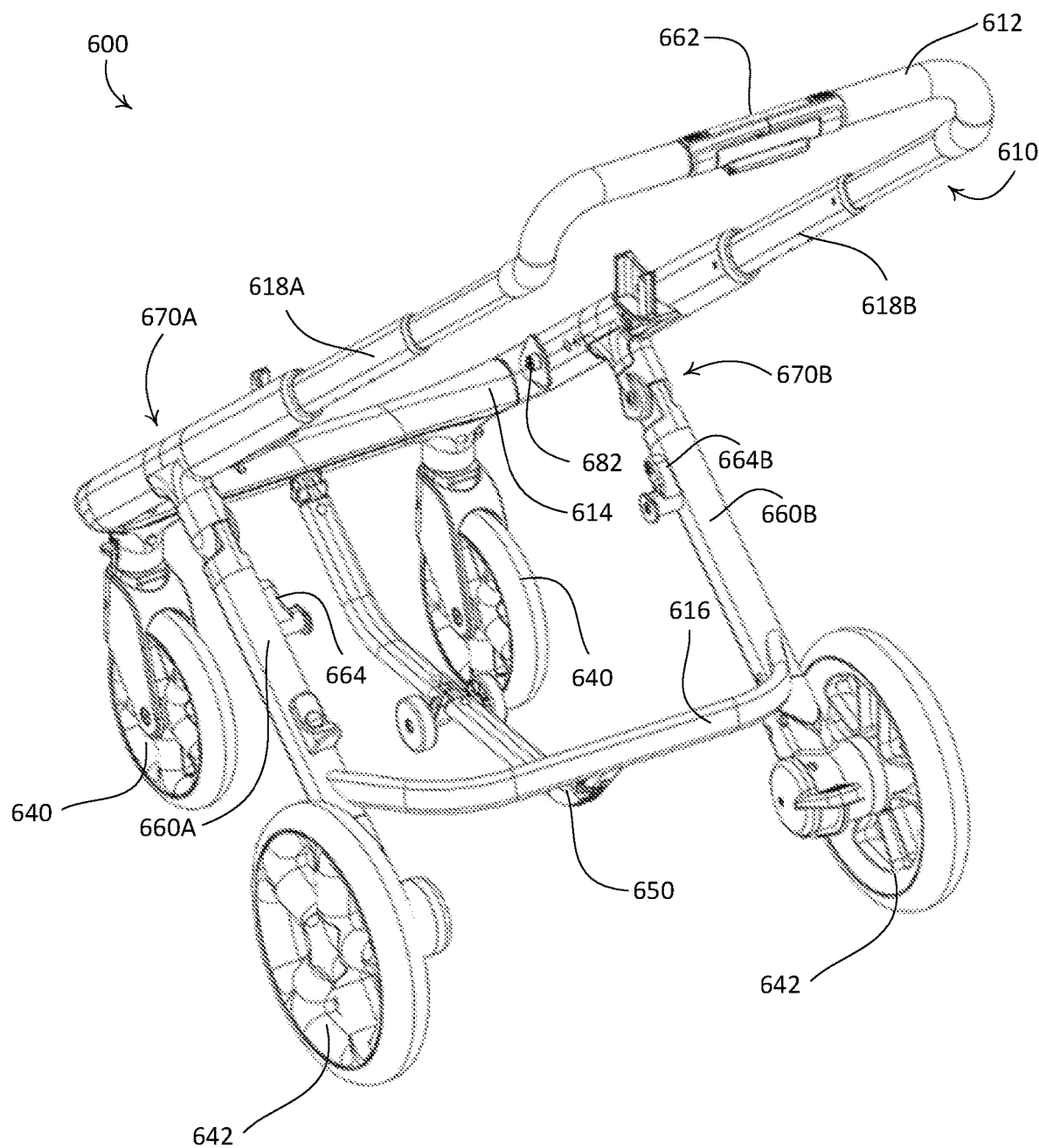
FIG. 6D is a rear isometric view of the example stroller assembly shown in FIG. 6A with the storage assembly and the seat assembly removed.

FIGS. 6A-6D depict an example stroller assembly 600 (e.g., such as the stroller assembly 100 shown in FIGS. 1A-1D and/or the stroller assembly 200 shown in FIGS. 2A-2C). FIG. 6A is a front isometric view of the example stroller assembly 600. FIG. 6B is a rear isometric view of the example stroller assembly 600 shown in FIG. 6A. As shown in FIGS. 6A and 6B, the example stroller assembly 600 may include one or more of a stroller frame 610, a storage assembly 620, a seat assembly 630, a plurality of wheels 640, 642, or a support 650. FIG. 6C is a detail view of the example stroller assembly 600 shown in FIG. 6A depicting a storage assembly 620 supported by the rear leg 660A. FIG. 6D is a rear isometric view of the example stroller assembly 600 shown in FIG. 6A with the storage assembly 620 and the seat assembly 630 removed.

The stroller frame 610 may define an open position, for example, as shown in FIGS. 6A-6D. The open position may represent a child carrying position such that the seat assembly 630 is configured to accept a child when the stroller frame 610 is in the open position. The stroller frame 610 may define a collapsed position. The collapsed position may represent a folded position such that the seat assembly 630 cannot be used, but the storage assembly 620 may be accessible. Alternatively, the seat assembly 630 may be configured to accept a child when the stroller frame 610 is in the collapsed position. The stroller frame 610 may define one or more intermediate positions between the open position and the collapsed position. The seat assembly 630 and/or the storage assembly 620 may be accessible when the stroller frame 610 is in an intermediate position. For example, the seat assembly 630 may be configured to accept a child when the stroller frame is in an intermediate position. In other words, the stroller assembly 600 may be configured such that a child remains in the seat assembly 630 as the stroller frame 610 is operated between the open position and the collapsed position.

The stroller frame 610 may be supported by the plurality of wheels 640, 642 when in the open position. The plurality of wheels 640, 642 may be connected to the stroller frame 610. The stroller frame 610 may be an assembly and may include a handlebar 612, a front horizontal bar 614, and a rear horizontal bar 616. The stroller frame 610 may include side bars 618A, 618B. For example, the side bars 618A, 618B may connect the handlebar 612 to the front horizontal bar 614. The side bars 618A, 618B may be in a substantially vertical position when the stroller frame 610 is in the collapsed position. The stroller frame 610 may include rear legs 660A, 660B. Each of the rear legs 660A, 660B may attach to a respective side bar of the side bars 618A, 618B. For example, rear leg 660A may attach to side bar 618A and rear leg 660B may attach to the side bar 618B. The rear horizontal bar 616 may attach to each of the rear legs 660A, 660B. The handlebar 612 may be in an upward position, a downward position, a horizontal position, and/or another position between the aforementioned positions when the stroller frame 610 is in the open position, the collapsed position, and/or an intermediate position. For example, the handlebar 612 may be in the upward position, the downward position, and/or an intermediate position when the stroller frame 610 is operated between the open position and the collapsed position.

The storage assembly 620 may include a storage assembly frame 622 and a basket 624. The basket 624 may be made from one or more materials and may include cloth, canvas, synthetic fiber, and/or molded plastic. The basket 624 may be configured to fit above the support 650. The basket 624 may be configured to receive items for storage, for example, via the front, rear, and/or sides of the stroller assembly 600. For example, the basket 624 may be accessible from the front, rear, and/or sides of the stroller assembly 600 when the stroller frame 610 is in the open position and/or a collapsed position. The storage assembly frame 622 may include an adapter 626. For example, the storage assembly frame 622 may receive the adapter 626. The adapter 626 may be configured to support the storage assembly 620, for example, when the stroller frame 610 is in the open position. The adapter 626 may include a finger 628 that extends from the adapter 626. The finger 628 may be a cylindrical extension. The storage assembly frame 622 may be made from one or more materials, for example, such as a metallic material, a plastic material, a composite material, and/or the like.

The storage assembly 620 may attach to the stroller frame 610. For example, the storage assembly 620 may attach to the stroller frame 610 via couplings 680A, 680B. The couplings 680A, 680B may define an attachment of the storage assembly 620 to the side bars 618A, 618B. For example, coupling 680A may attach the storage assembly 620 to the side bar 618A and coupling 680B may attach the storage assembly 620 to the side bar 618B. The couplings 680A, 680B may include a socket 682. The socket 682 may be configured to receive a pin (not shown) of the storage assembly 620. The socket 682 and the pin may enable the storage assembly to swivel about the couplings 680A, 680B.

The rear legs 660A, 660B may be configured to support the storage assembly 620 when the stroller frame 610 is in the open position. For example, a brace 664 may be attached to each of the rear legs 660A, 660B. The brace 664 may be configured to align with the finger 628 of the adapter 626, for example, when the stroller frame 610 is in the open position. The finger 628 may abut the brace 664 such that the storage assembly 620 is supported in a substantially horizontal position, for example, when the stroller frame 610 is in the open position. The adapter 626, the finger 628, and/or the brace 664 may be configured to support the storage assembly 620 and the contents and/or items stored within the storage assembly. For example, a diameter of the finger 628 and/or the thickness of the brace 664 may be determined based on the weight of the storage assembly 620 and the contents and/or items that may be stored within the storage assembly 620. The adapter 626, the finger 628, and/or the adapter 626 may be metal and/or plastic. The stroller frame 610 (e.g., the handlebar 612, the front horizontal bar 614, the rear horizontal bar 616, the side bars 618A, 618B, and/or the rear legs 660A, 660B, etc.) may be made from one or more materials, for example, such as a metallic material, a plastic material, a composite material, and/or the like.

The stroller frame 610 may include a handle 662. The handle 662 may be located along the handlebar 612. The handle 662 may be configured to operate the stroller frame 610 from an open position to a collapsed position (e.g., as shown in FIG. 7C). For example, the handle 662 may be configured to collapse the stroller frame 610 from the open position to the collapsed position. The handle 662 may be operably connected to one or more pivots 670A, 670B defined by the stroller frame 610. For example, the stroller frame 610 may include pivots 670A, 670B. The handle 662 may be configured to lock and/or unlock the pivots 670A, 670B such that the stroller frame 610 may be operated between the open position and the collapsed position. When the stroller frame 610 is in the open position and the pivots 670A, 670B are unlocked (e.g., via the handle 662), the rear legs 660A, 660B may rotate toward the front horizontal bar 614 and the handlebar 612 may move upward toward the front horizontal bar 614.

The support 650 may be a part of the stroller frame 610. The support 650 may be referred to as a kickstand, a stand, a supporting stand, and/or the like. The support 650 may be configured to attach to the stroller frame 610. For example, the support 650 may attach at one or more locations on the stroller frame 610. The support 650 may attach to the front horizontal bar 614 and the rear horizontal bar 616. For example, the support 650 may attach at a midpoint of the front horizontal bar 614 and at a midpoint of the rear horizontal bar 616. The support 650 may be configured to be below the basket assembly 620 when the stroller frame 610 is in the open position. For example, the support 650 may be curved downward from the attachment at the front horizontal bar 614 and/or from the attachment at the rear horizontal bar 616. The support 650 may include one or more support wheels 652. The support 650 may be configured such that the support wheels 652 are distal from the ground when the stroller frame 610 is in the open position. For example, the support wheels 652 may not abut the ground when the stroller frame 610 is in the open position. The support 650 may be made from one or more materials, for example, such as a metallic material, a plastic material, a composite material, and/or the like.

The support 650 may be configured to be automatically deployed when the stroller frame 610 is operated (e.g., collapsed and/or closed) from the open position to a collapsed position (e.g., a partially collapsed position or a fully collapsed position). The support 650 may be configured to automatically retract when the stroller frame 610 is operated (e.g., unfolded and/or opened) from the collapsed position to the open position.

The storage assembly 620 may be configured to be automatically moved when the stroller frame 610 is operated between the open position and the collapsed position.

The plurality of wheels 640, 642 may be configured to abut the ground when the stroller frame 610 is in the open position. The wheels 640 may be front wheels. The wheels 640 may be configured such that steering of the stroller assembly 600 is enabled. For example, the wheels 640 may swivel around an attachment axis 641. The attachment axis 641 may be defined by the attachment of the wheels 640 to the stroller frame 610. The wheels 642 may be rear wheels. The wheels 642 may be configured to attach to the stroller frame 610 at the rear legs 660A, 660B. The wheels 640 may be configured to attach to the stroller frame 610 at the front horizontal bar 614.

The stroller frame 610 may be configured to adjust the height of the handlebar 612. The length of the side bars 618A, 618B may be adjustable. The side bars 618A, 618B may be retractable. For example, the side bars 618A, 618B may include portions (e.g., two or more) of varying size that telescope within one another. The seat assembly 630 may attach to the side bars 618A, 618B. For example, the seat assembly 630 may pivotally attach to the side bars 618A, 618B.

Although the stroller assembly 600 is shown as having one seat assembly 630, the stroller assembly 600 may include a plurality of seat assemblies. For example, the stroller assembly 600 may include a plurality of seat assemblies arranged next to each other and/or in front/behind one another.

Although the stroller frame 610 shown in FIGS. 6A-6D includes the rear horizontal bar 616, the stroller frame 610 may not include the rear horizontal bar 616. For example, the rear legs 660A, 660B may not be connected to one another. The support 650 may attach to the front horizontal bar 614 only, if the stroller frame 610 does not include the rear horizontal bar 616. Alternatively, the support 650 may attach to the front horizontal bar 614 and a portion of the storage assembly 620 (e.g., such as a frame of the basket assembly 620).

Although the stroller frame 610 shown in FIGS. 6A-6D includes the front horizontal bar 614, the stroller frame 610 may not include the front horizontal bar 614. Alternatively, the front horizontal bar 614 may not be horizontal. For example, the side bars 618A, 618B may not be connected to one another. Alternatively, the side bars 618A, 618B may be connected by a bar that is not horizontal. The support 650 may attach to the rear horizontal bar 616 only, if the stroller frame 610 does not include the front horizontal bar 614. Alternatively, the support 650 may attach to the rear horizontal bar 616 and a portion of the storage assembly 620 (e.g., such as a frame of the basket assembly 620).

Figure 7A:
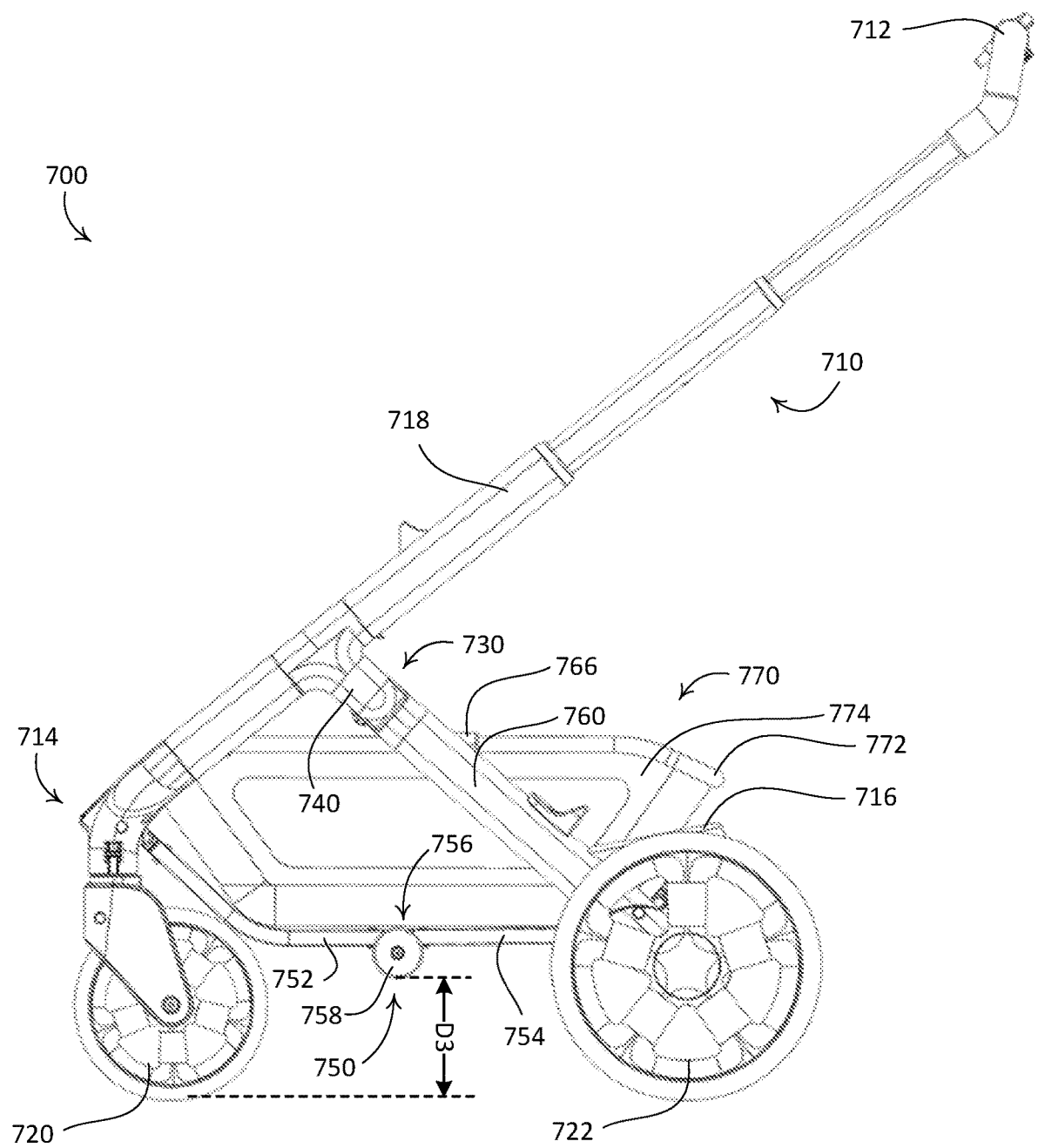
FIG. 7A is a side view of an example stroller assembly in an open position.
Figure 7B:
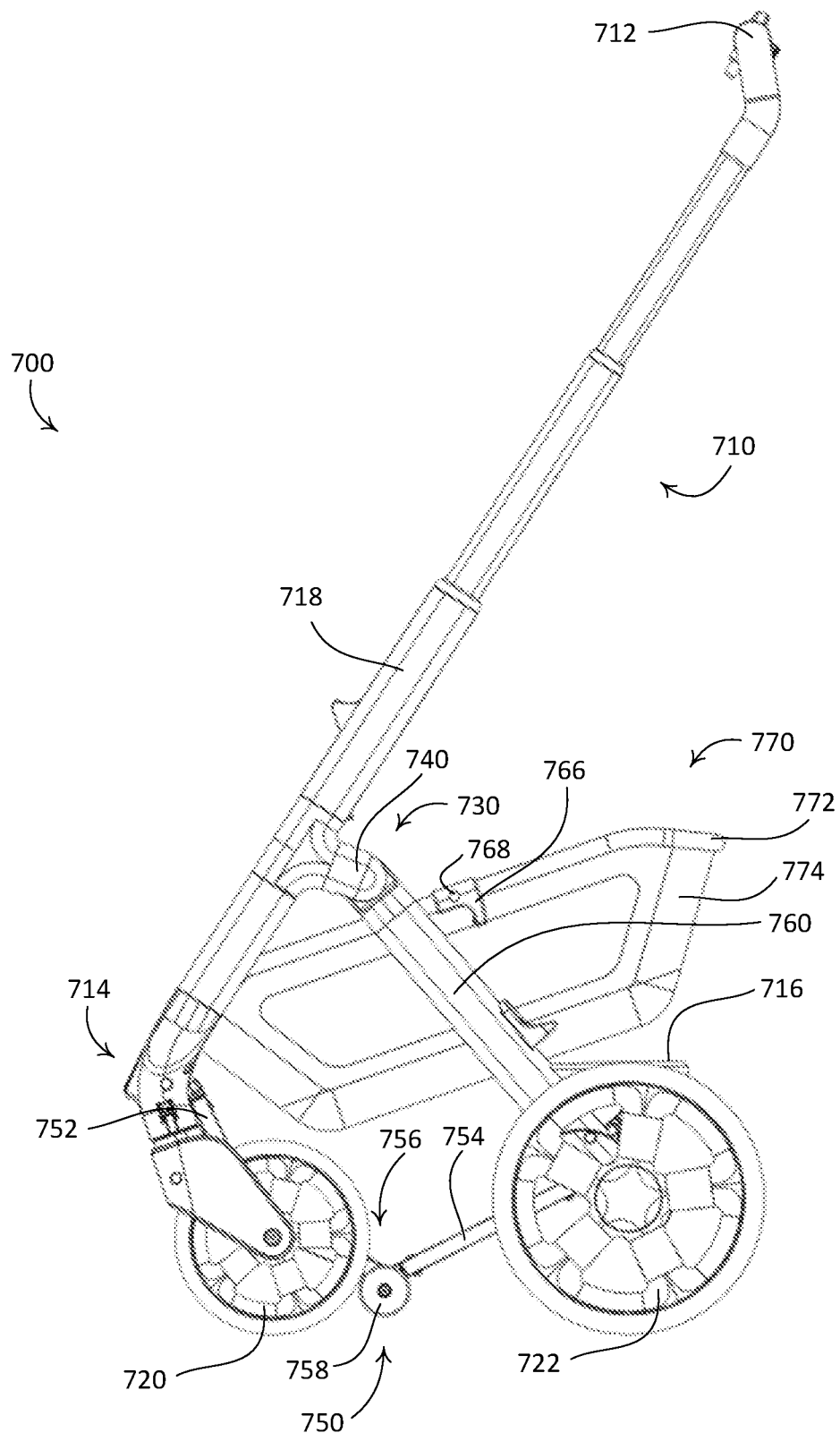
FIG. 7B is a side view of the example stroller assembly shown in FIG. 7A in an intermediate position.
Figure 7C:
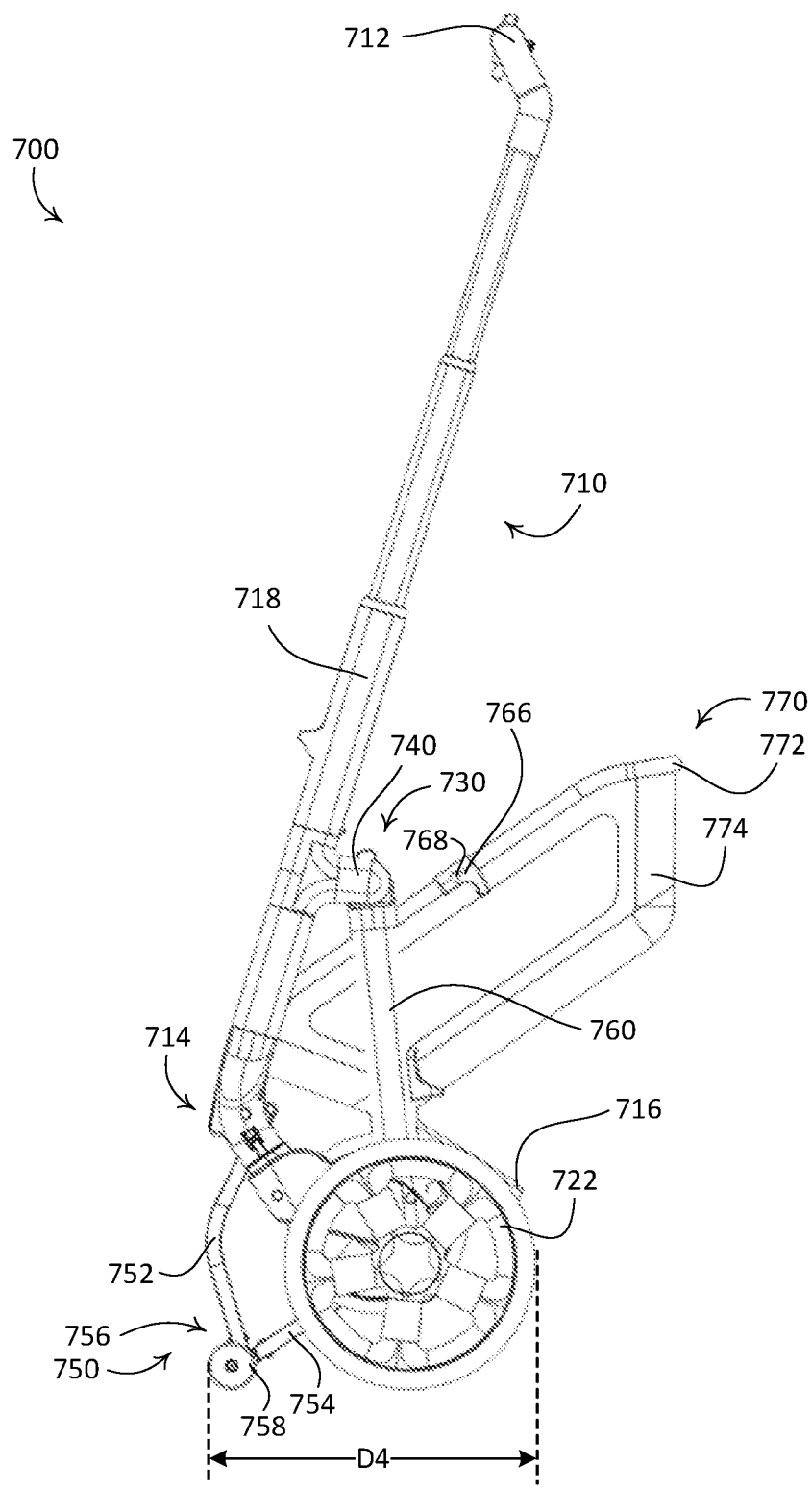
FIG. 7C is a side view of the example stroller assembly shown in FIG. 7A in a collapsed position with the storage assembly in a first position.
Figure 7D:
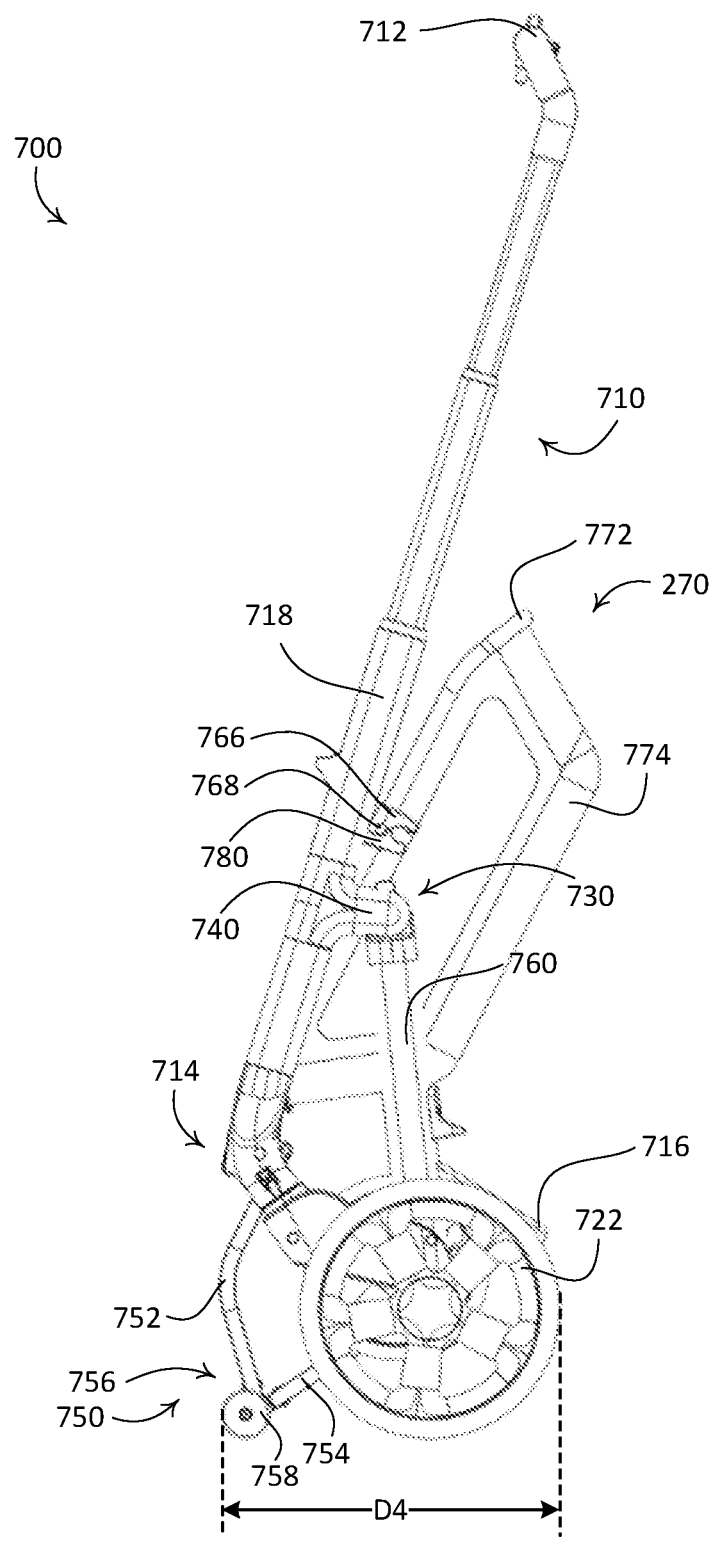
FIG. 7D is a side view of the example stroller assembly shown in FIG. 7A in a collapsed position with the storage assembly in a second position.

FIG. 7A-7D are side views of an example stroller assembly 700 (e.g., such as the stroller assembly 600 shown in FIGS. 6A-6D) as the stroller assembly 700 is operated between an open position and a collapsed position. For example, the stroller assembly 700 may be configured to be collapsed from the open position to the collapsed position. As another example, the stroller assembly 700 may be configured to be opened from the collapsed position to the open position. The example stroller assembly 700 may include a stroller frame 710 (e.g., such as the stroller frame 610); a plurality of wheels 720, 722 (e.g., such as the plurality of wheels 640, 642); a support 750 (e.g., such as the support 650); and a storage assembly 770 (e.g., such as the storage assembly 620). The stroller frame 710 may be configured to be operated between the open position, for example, as shown in FIG. 7A; the intermediate position, for example, as shown in FIG. 7B; and the collapsed position, for example, as shown in FIGS. 7C and 7D. The intermediate position may be defined as a position between the open position and the collapsed position.

The stroller frame 710 may include a handlebar 712, a front horizontal bar 714, a rear horizontal bar 716, side bars 718, rear legs 760, and pivot joints 730. The side bars 718 may connect the handlebar 712 to the front horizontal bar 714. For example, a first end of the side bars 718 may attach to the handlebar 712 and a second end of the side bars 718 may connect to the front horizontal bar 714. Each of the rear legs 760 may attach to a respective side bar of the side bars 718. For example, the stroller frame 710 may define a pivot joint 730 where the rear leg 760 attaches to the side bar 718. The rear horizontal bar 716 may attach to the rear legs 760. For example, a first end of the rear horizontal bar 716 may attach to a first rear leg of the rear legs 760 and a second end of the rear horizontal bar 716 may attach to a second leg of the rear legs 760. The rear horizontal bar 716 may be curved such that the rear horizontal bar 716 extends away from the rear legs 760 in a direction opposed from the front horizontal bar 714. The rear horizontal bar 716 may be curved, for example, to receive a basket assembly (e.g., such as the basket assembly 620 shown in FIGS. 6A and 6B).

The plurality of wheels 720, 722 may include one or more front wheels 720 and one or more rear wheels 722. When the stroller frame 710 is in the open position, the stroller assembly 700 may be supported by the plurality of wheels 720, 722.

The pivot joints 730 may be configured to enable operation of the stroller frame 710 between the open position and the collapsed position. The pivot joints 730 may define the attachment of the rear legs 760 to the side bars 718. For example, the rear legs 760 may attach to the side bars 718 via the pivot joints 730. The stroller frame 710 may include rear leg connectors 740. The rear leg connectors 740 may extend from the side bars 718. The rear legs 760 may attach to the side bars 718 via the rear leg connectors 740. For example, the rear legs 760 may attach to the rear leg connectors 740. The rear legs 760 may attach to the rear leg connectors 740 via the pivot joint 730. For example, the rear leg connectors 740 may include the pivot joints 730. The rear legs 760 may pivot at the pivot joints 730 when the stroller frame 710 is operated between the open position and the collapsed position.

The rear legs 760 may be configured to lock in a first position when the stroller frame 710 is in the open position. The rear legs 760 may be configured to lock in a second position when the stroller frame 710 is in the collapsed position. For example, the stroller frame 710 may include a lock (not shown) that is configured to lock the rear legs 760 in the first position and/or the second position. As another example, the stroller frame 710 may include a first lock for the first position and a second lock for the second position. The lock may be actuated via the handle 762. For example, the handle 762 may be operably connected to the lock and/or the pivot joints 730. When the handle 762 is actuated, the lock may be released. When the lock is released, the rear legs 760 may pivot such that the stroller frame is operable between the open position and the collapsed position.

The storage assembly 770 may include a storage assembly frame 772 and a basket 774. The storage assembly frame 772 may include hollow aluminum tubes and/or molded plastic. The basket 774 may be made from one or more materials that may include cloth, canvas, synthetic fiber, and/or molded plastic. The basket 774 may be configured to fit above the support 750. The basket 774 may be configured to receive items for storage, for example, via the front, rear, and/or sides of the stroller assembly. For example, the basket 774 may be accessible from the front, rear, and/or sides of the stroller assembly 700 when the stroller frame 710 is in the open position and/or a collapsed position. The storage assembly frame 772 may include an adapter 766. For example, the storage assembly frame 772 may receive the adapter 766. The adapter 766 between a midpoint of the stroller frame 710 and a rear bar of the stroller frame 710. The adapter 766 may be configured to support the storage assembly 770, for example, when the stroller frame 710 is in the open position. The adapter 766 may include a finger 768 that extends therefrom. The finger 768 may be a cylindrical extension.

The storage assembly 770 may attach to the stroller frame 710. For example, the storage assembly 770 may attach to the stroller frame 710 via couplings (e.g., such as couplings 680A, 680B shown in FIGS. 6A and 6B) at the side bars 718. The couplings may define a socket and a pin. The couplings may enable the storage assembly to swivel about the side bars 718 of the stroller frame 710.

The support 750 may include a first arm 752, a second arm 754, a joint 756, and one or more support wheels 758. When the stroller assembly 700 is in the open position, the support wheel(s) 758 of the support 750 may be spaced from the ground, for example, by a distance D3. The distance D3 may be configured such that ground clearance is maintained beneath the support 750. The distance D3 may be in the range of 2 in to 12 in. In an example, the distance D3 may be approximately 5.5 in. The first arm 752 may be configured to attach to the front horizontal bar 714. For example, the first arm 752 may pivotally connect to the front horizontal bar 714. The first arm 752 may pivot with respect to the front horizontal bar 714. The second arm 754 may be configured to attach to the rear horizontal bar 716. For example, the second arm 754 may pivotally connect to the rear horizontal bar 716. The second arm 754 may pivot with respect to the rear horizontal bar 716. The first arm 752 may attach to the second arm 754. For example, the first arm 752 and the second arm 754 may connect at a joint 756. The first arm 752 may be configured to rotate about the joint 756 toward the second arm 754 when the stroller frame 710 is operated between the open position and the collapsed position. The joint 756 may be a revolute joint having a pin that extends through the joint 756. The first arm 752 and the second arm 754 may rotate about the pin. When the first arm 752 rotates toward the second arm 754, the support wheel(s) 758 may contact the ground (e.g., when the stroller frame 710 is in the collapsed position).

The support 750 may be configured to support the stroller assembly 700 in a substantially vertical position when the stroller frame 710 is in the collapsed position. The support 750 may be configured to support the stroller assembly 700 and enable access to a storage compartment (e.g., such as the storage assembly 620 shown in FIGS. 6A and 6B). The support wheel(s) 758 may be configured such that the stroller assembly 700 can be pushed or pulled when the stroller frame 710 is in the collapsed position. The support wheel(s) 758 and the rear wheels 722 may be configured to balance the stroller assembly 700 in a substantially vertical position (e.g., as shown in FIG. 7C) when the stroller frame 710 is in the collapsed position. For example, the support wheel(s) 758 may engage the ground and the front wheels 720 may be raised off the ground when the stroller frame 710 is in the collapsed position. The center of gravity of the stroller assembly 700 may be located between the support wheel(s) 758 and the rear wheels 722 when the stroller frame 710 is in the collapsed position. The stroller assembly 700 may be configured to be pushed and/or pulled when the stroller frame 710 is in the collapsed position. For example, the support wheel(s) 758 and the rear wheels 722 may be configured to rotate when a force is applied to the stroller frame 710 (e.g., such as the handlebar 712) in the collapsed position.

The support 750 may be configured to be automatically deployed when the stroller frame 710 is operated (e.g., collapsed and/or closed) from the open position to the collapsed position (e.g., a partially collapsed position or a fully collapsed position). The support 750 may be configured to automatically retract when the stroller frame 710 is operated (e.g., unfolded and/or opened) from the collapsed position to the open position.

As shown in FIG. 7A, one or more of the following may apply when the stroller frame 710 is in the open position. The rear legs 760 may be locked in the first position. For example, the pivot joints 730 may be configured to lock the rear legs 760 in the first position. The support 750 may be positioned below the basket assembly (not shown). The support wheel(s) 758 of the support 750 may not abut the ground. The rear legs 760 may be configured to support the storage assembly 770. For example, a brace (e.g., such as the brace 664 shown in FIG. 6C) may be attached to each of the rear legs 760. The brace may be configured to align with the finger 768 of the adapter 766. The finger 768 may abut the brace such that the storage assembly 770 is supported in a substantially horizontal position.

As shown in FIG. 7B, one or more of the following may apply when the stroller frame 710 is in the intermediate position. The rear legs 760 may be unlocked and in a pivoting position. For example, the rear legs 760 may pivot towards the front horizontal bar 714. The support 750 may pivot at the joint 756 such that the first arm 752 pivots toward the second arm 754. The joint 756 may move downwards toward the ground such that the support wheel(s) 758 move toward the ground. For example, the support wheel(s) 758 may not abut the ground when the stroller frame 710 is in the intermediate position. The handlebar 712 may move upwards toward the substantially vertical position. The storage assembly 770 may rotate upward toward the side bars 718. For example, the finger 768 may not contact the brace. The storage assembly 770 may be supported at the couplings. The couplings may enable the storage assembly 770 to swivel (e.g., automatically swivel) about the side bars 718 of the stroller frame 710. For example, the couplings may define extensions that may be configured to apply a force to the storage assembly frame 772 such that the storage assembly is pivoted upward.

As shown in FIG. 7C, one or more of the following may apply when the stroller frame 710 is in the collapsed position. The rear legs 760 may be locked in the second position. The support 750 may be bent such that the support wheel(s) 758 abuts the ground. The support wheel(s) 758 of the support 750 may be spaced from the rear wheels 722, for example, by a distance D4. The distance D4 may be configured such that the stroller assembly 700 is stable (e.g., the center of gravity of the stroller assembly 700 is near the midpoint of the distance D4) when the stroller frame 710 is in the collapsed position. For example, the distance D4 may be in the range of 8 in to 24 in. In an example, the distance D4 may be approximately 16.5 in. The support 750 may be configured to optimize (e.g., minimize) the distance D4 while maintaining the stability of the stroller assembly 700 in the substantially vertical position. The distance D4 may be determined based on a distance between the front horizontal bar 714 and the rear horizontal bar 716 when the stroller frame 710 is in the open position. The distance D4 may be determined based on a distance between the front wheels 720 and the rear wheels 722. The handlebar 712 may be accessed to enable a user to move the stroller assembly 700 when the stroller frame 710 is in the collapsed position. For example, the handlebar 712 may be in an upward position (e.g., a vertical position). Alternatively, the handlebar 712 may be in a horizontal position or a downward position. The storage assembly 770 may be in a first position. The extensions may apply a force to the storage assembly frame 772 such that the storage assembly is pivoted upward and maintained in the first position. The first position may be an access position. For example, contents and/or items in the basket 774 of the storage assembly 770 may be accessible when the storage assembly 770 is in the first position.

As shown in FIG. 7D, the storage assembly 770 may be moved from the first position to a second position when the stroller frame 710 is in the collapsed position. For example, the storage assembly 770 may be manually operated between the first position and the second position. The storage assembly 770 may not be accessible when in the second position. The storage assembly frame 772 may be proximate to the side bars 718 when the storage assembly 770 is in the second position. A latch 780 may be attached to one or more of the side bars 718. The latch 780 may be configured to lock the storage assembly in the second position. For example, the latch 780 may be configured to engage and retain the finger 768. The latch 780 may be automatically operated (e.g., spring operated). For example, the latch 780 may automatically engage the finger 768 such that the finger 768 is locked within the latch 780. The latch 780 may be manually operated. For example, the latch 780 may be manually disengaged from the finger 768 such that the storage assembly 770 can be operated from the second position to the first position. As another example, the latch 780 may be manually operated to engage and disengage the finger 768. Although FIG. 7D shows that the latch 780 may engage the finger 768, the latch 780 may engage another part of the storage assembly 770 to lock the storage assembly in the second position.

Figure 8A:
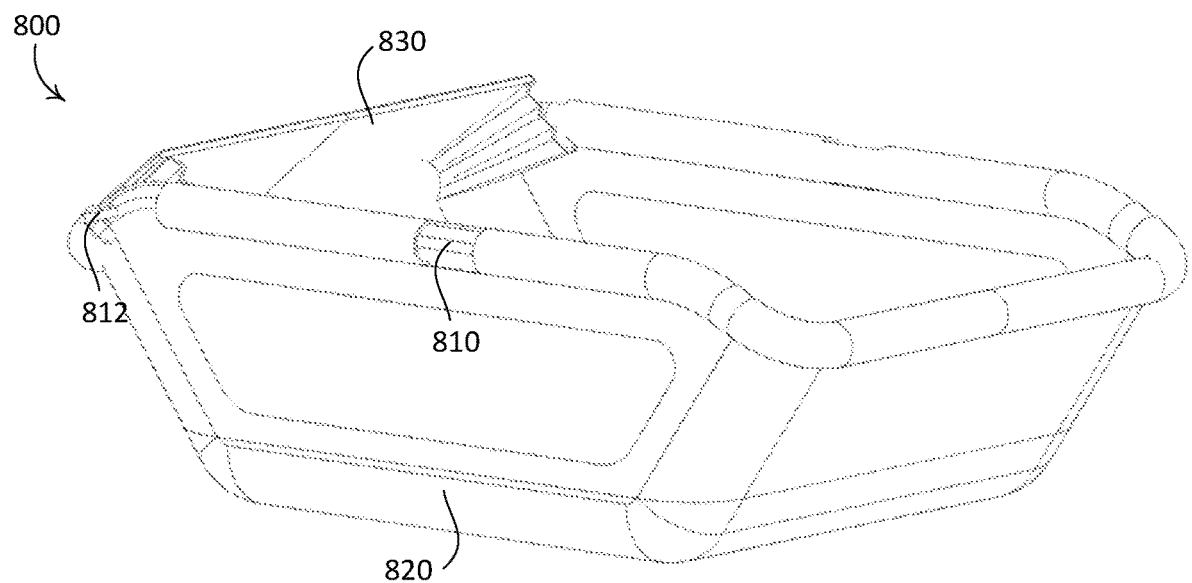
FIG. 8A is an isometric view of an example storage assembly.
Figure 8B:
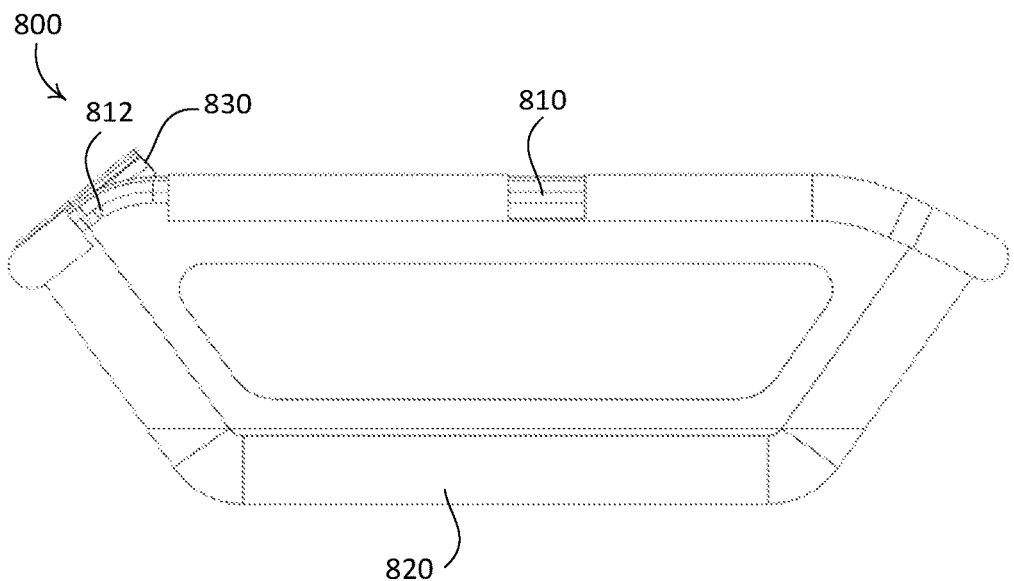
FIG. 8B is side view of the example storage assembly shown in FIG. 7A.

FIGS. 8A-8B depict an example storage assembly 800 (e.g., such as the storage assembly 620 shown in FIGS. 6A-6C and/or the storage assembly 770 shown in FIGS. 7A-7D) for a stroller assembly (e.g., such as the stroller assembly 600 shown in FIGS. 6A-6D and/or stroller assembly 700 shown in FIGS. 7A-7D). The storage assembly may include a frame 810, basket 820, and a cover 830. The frame 810 may be a structural member that defines an upper profile of the storage assembly 800. For example, the frame 810 may extend along the outer upper boundaries of the storage assembly 800. The frame 810 may include one or more pins 812. For example, the frame 810 may include pins 812 that extend from opposed sides of the storage assembly 800. The pins 812 may be configured to attach the storage assembly 800 to the stroller assembly. The frame 810 may be curved (e.g., downward) at the front and/or rear, for example to enable greater access to the basket 820.

The basket 820 may include fabric and/or plastic. The basket 820 may be attached (e.g., removably attached) to the frame 810. For example, the basket 820 may be suspended from the frame 810. The cover 830 may be attached (e.g., removably attached) to the frame 810 and/or the basket 820. The cover 830 may be configured to extend over a portion of the storage assembly 800. The cover 830 may be configured to prevent items within the basket 820 from sliding out of the basket 820 when the storage assembly 800 is pivoted upward (e.g., moved to the first position and/or second position as shown in FIGS. 7A-7D). For example, the cover 830 may be installed proximate to the front of the stroller assembly. The cover 830 may be configured to expand, for example, such that additional items may be held within the basket 820.

Figure 9:
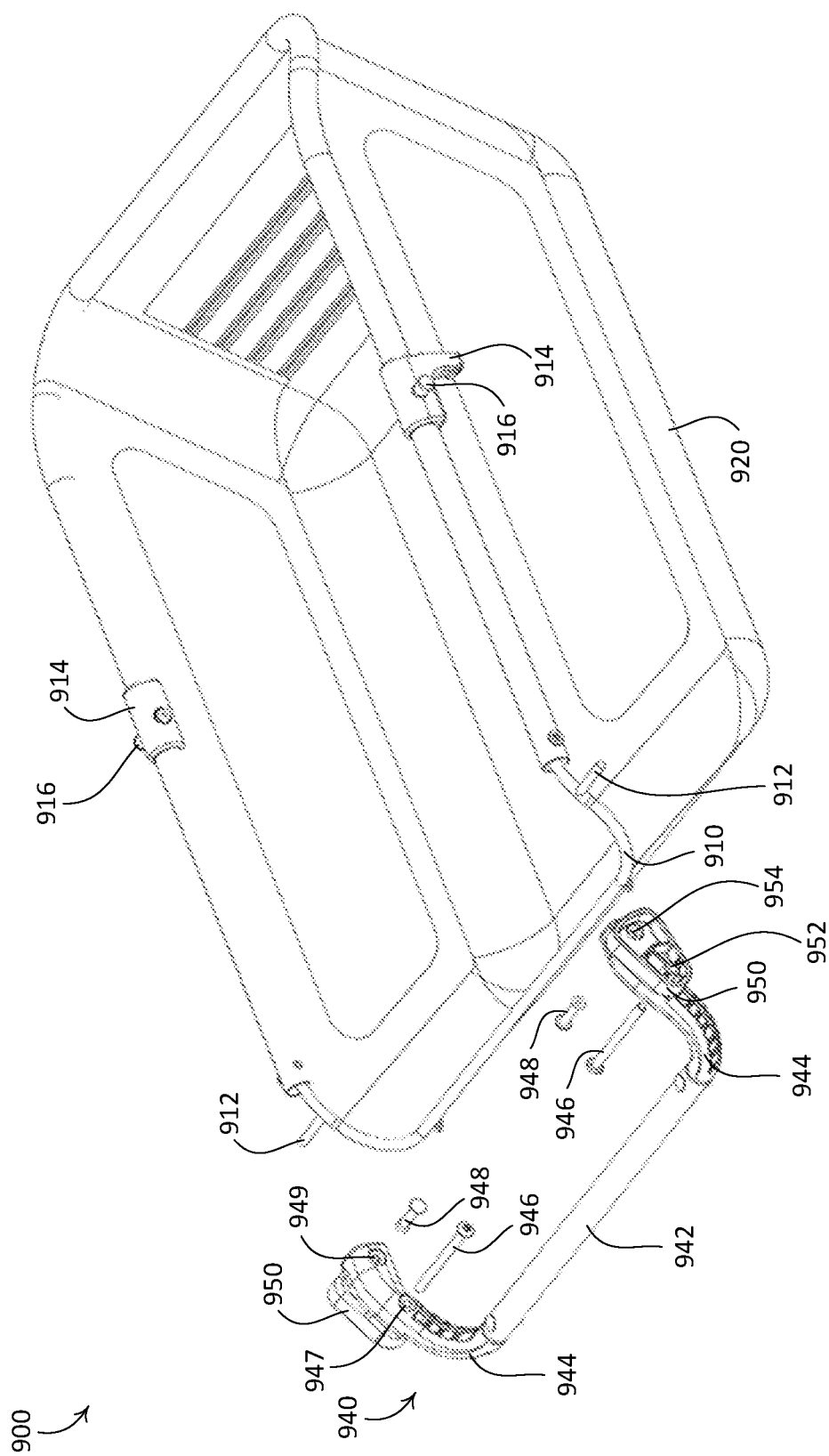
FIG. 9 is a partially exploded view of an example storage assembly.

FIG. 9 depicts an example storage assembly 900. The storage assembly 900 may include a frame 910, a basket 920, and an adapter 914 (e.g., such as the adapter 766 shown in FIGS. 7B-7D) defining a finger 916 (e.g., such as the finger 768 shown in FIGS. 7B-7D). The example storage assembly 900 may be configured to receive a mounting adapter 940. The mounting adapter 940 may be configured to attach the storage assembly 900 to a stroller frame (e.g., such as the stroller frame 610 shown in FIGS. 6A-6D and/or the stroller frame 710 shown in FIGS. 7A-7D). For example, the mounting adapter 940 may include a front bar 942, corner members 944, and pivot guides 950. The pivot guides 950 may define holes 952, 954 therethrough. The corner members 944 may define holes 947, 949 therethrough. The holes 947 and the holes 952 may be configured to receive pins 946. The pins 946 may be rivets or some other fastener, for example. The pins 946 may be configured to attach the storage assembly 900 to the stroller frame. The pins 946 may extend through the corner members 944 and the pivot guides 950; and may extend into the stroller frame. The pins 946 may enable the storage assembly 900 to pivot about the pins 946 when the stroller frame is operated between an open position and a collapsed position. The holes 949 and the holes 954 may be configured to receive fasteners 948. The fasteners 948 may be short pins and may be rivets or some other fastener, for example. The fasteners 948 may be configured to attach the pivot guides 950 to the corner member 944.

Figure 10B:
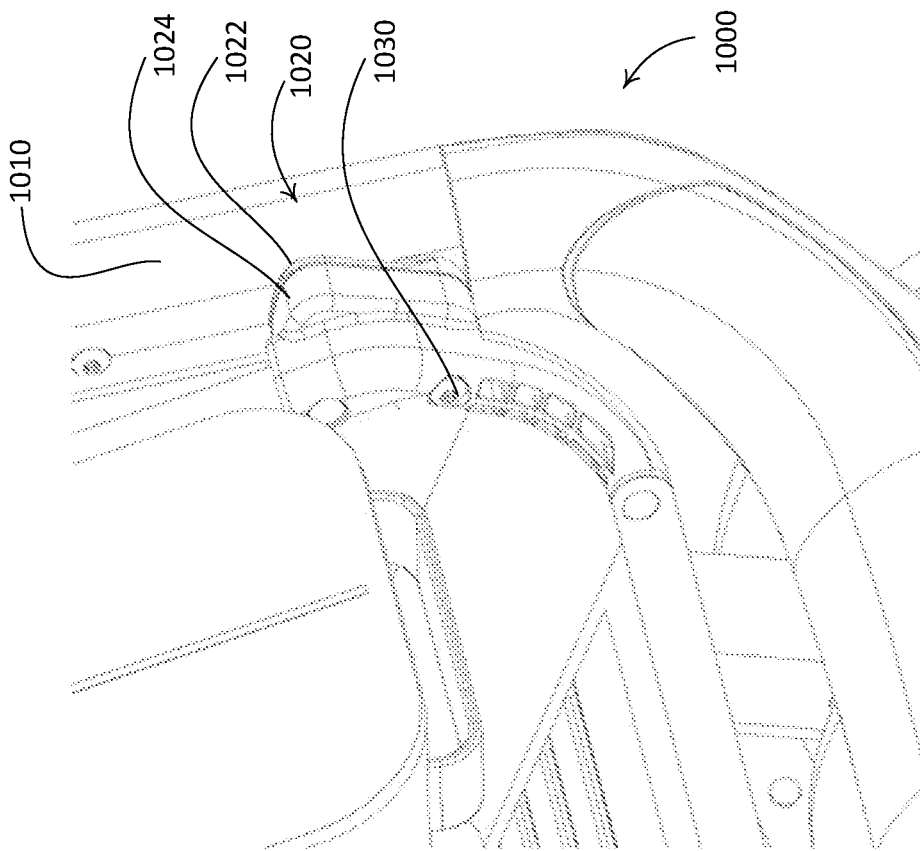
FIG. 10B is a detail view of the example coupling attaching the storage assembly to the stroller frame when the stroller frame is in a collapsed position.
Figure 10A:
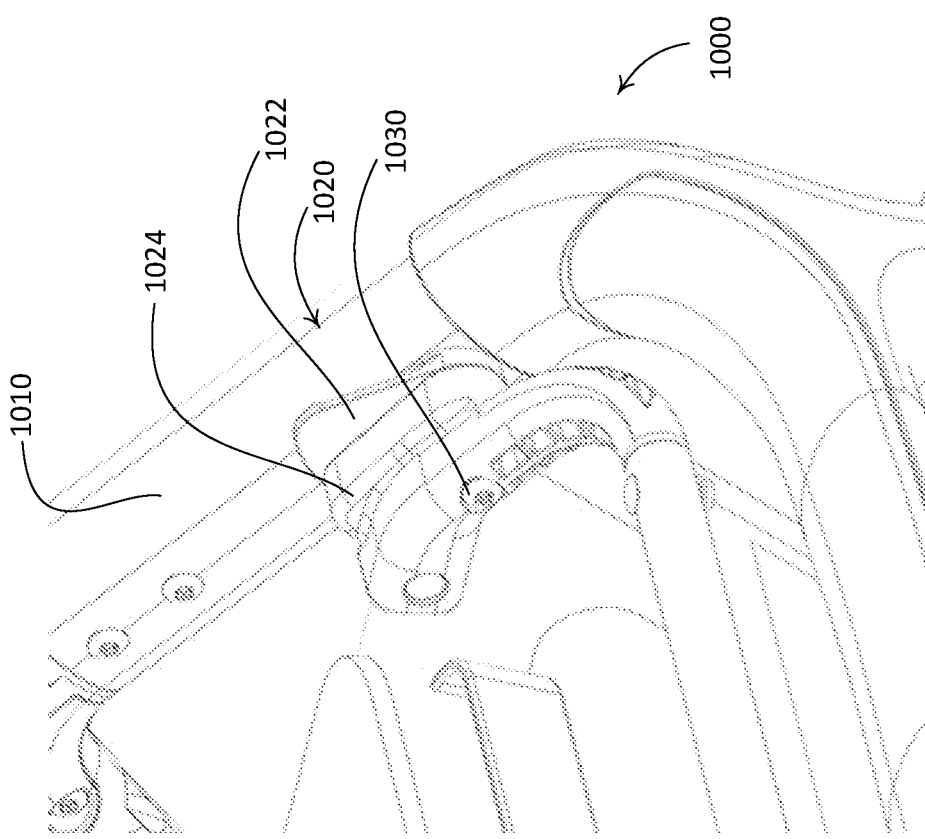
FIG. 10A is a detail view of the example coupling attaching the storage assembly to the stroller frame when the stroller frame is in an open position.

FIGS. 10A-10B depict an example attachment of a storage assembly frame 1010 to a stroller frame 1000 (e.g., such as the stroller frame 610 shown in FIGS. 6A-6D and/or stroller frame 710 shown in FIGS. 7A-7D). FIG. 10A depicts the attachment of the storage assembly frame 1010 to the stroller frame 1000 when the stroller frame 1000 is in the open position. FIG. 10B depicts the attachment of the storage assembly frame 1010 to the stroller frame 1000 when the stroller frame 1000 is in the collapsed position. The storage assembly frame 1010 may attach to the stroller frame 1000 via one or more couplings, for example, such as coupling 1020. The coupling 1020 may include an extension 1022, a pivot guide 1024, and a pin 1030. The coupling 1020 may be configured to enable the storage assembly frame 1010 to pivot about the pin 1030 when the stroller frame 1000 is operated between an open position and a collapsed position. For example, the storage assembly frame 1010 may automatically pivot about the pin 1030 when the stroller frame 1000 is operated. The extension 1022 may located proximate to the connection of a side bar and a front horizontal bar of the stroller frame 1000. The extension 1022 may be a blade of plastic. The extension 1022 may be configured to abut the pivot guide 1024. The extension 1022 may apply a force to the storage assembly frame 1010. For example, the extension 1022 may apply a force to the pivot guide 1024 when the stroller frame 1000 is operated. The force applied to the pivot guide 1024 may cause the storage assembly frame 1010 to pivot upwards (e.g., as shown in FIGS. 7B and 7C) to the first position.

Figure 11B:
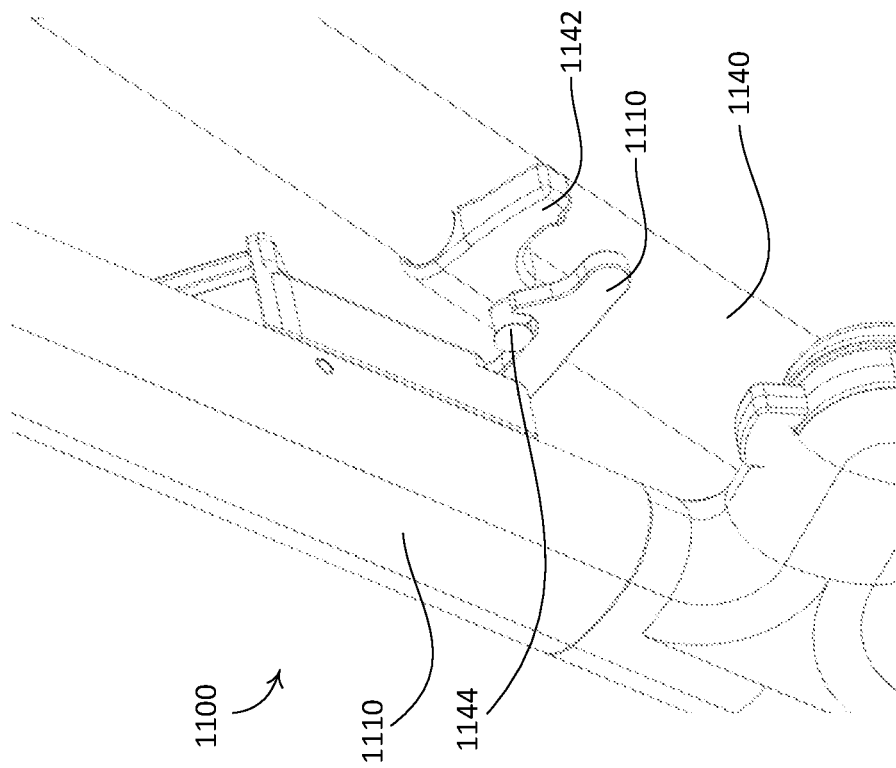
FIG. 11B is an isometric view of the example latch shown in FIG. 11A in a locked position.
Figure 11A:
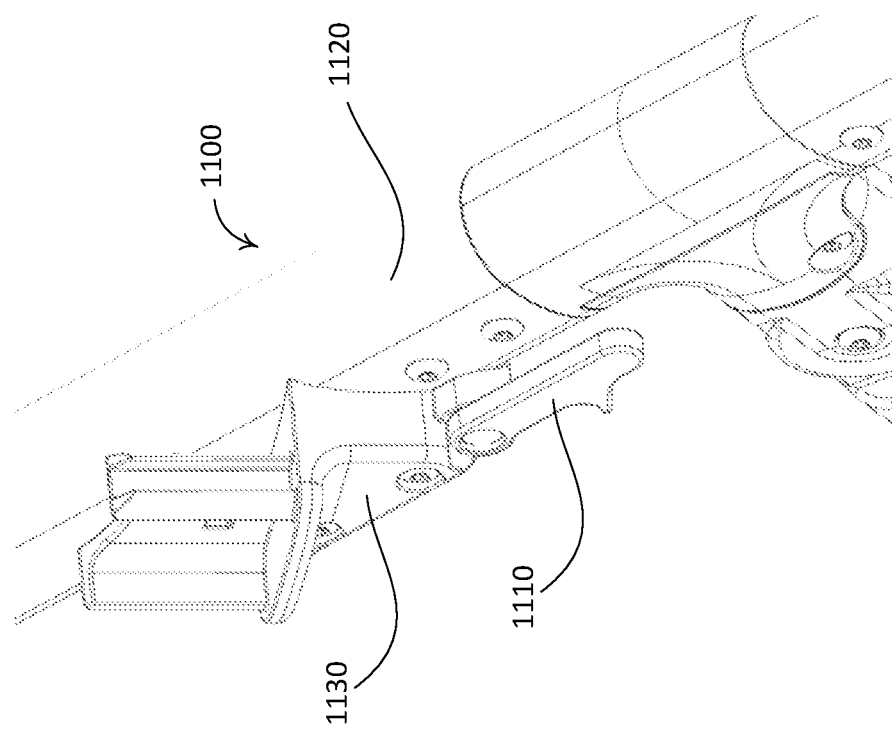
FIG. 11A is an isometric view of an example latch, of a stroller assembly, in an unlocked position.

FIGS. 11A and 11B depict an example latch 1110 for a stroller assembly (e.g., such as the stroller assembly 600 shown in FIGS. 6A-6D and/or stroller assembly 700 shown in FIGS. 7A-7D). The latch 1110 may be configured to attach to a stroller frame 1100. For example, the latch 1110 may attach to a side bar 1120 of the stroller frame 1100. The latch 1110 may attach to the side bar 1120, for example, via a seat assembly adapter 1130. The seat assembly adapter 1130 may be attached to the stroller frame 1100. The seat assembly adapter 1130 may be configured to receive and attach a seat assembly to the stroller frame 1100. As shown in FIG. 11A, the latch 1110 may be in an unlocked position when the stroller frame is not in the collapsed position. As shown in FIG. 11B, the latch 1110 may be moved to a locked position when the stroller frame is in the collapsed position. The latch 1110 may engage a finger 1144 defined by an adapter 1142 of a storage assembly frame 1140. For example, the latch 1110 may be manually operated to the locked position such that the latch 1110 engages the finger 1144.

FIGS. 12A-12D depict an example stroller assembly 1200 (e.g., such as the stroller assembly 600 shown in FIGS. 6A-6D and/or the stroller assembly 700 shown in FIGS. 7A-7C). stroller assembly 1200 may include a storage assembly 1210. The storage assembly 1210 may include on or more storage compartments 1220. The storage compartments 1220 may define removable contained storage that is configured to fit within the storage assembly 1210. The storage compartments 1220 may include handles 1222, for example, to enable the storage compartments to be carried. The storage compartments 1220 may include lids configured to cover an opening of the storage compartments 1220. For example, the lids may cover the contents and/or items within the storage compartments 1220.

Figure 12B:
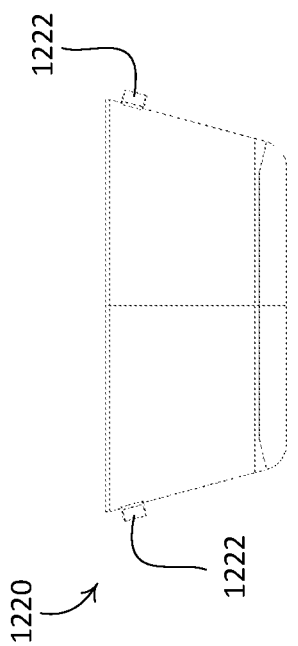
FIG. 12B is a side view of an example storage compartment shown in FIG. 12A.
Figure 12A:
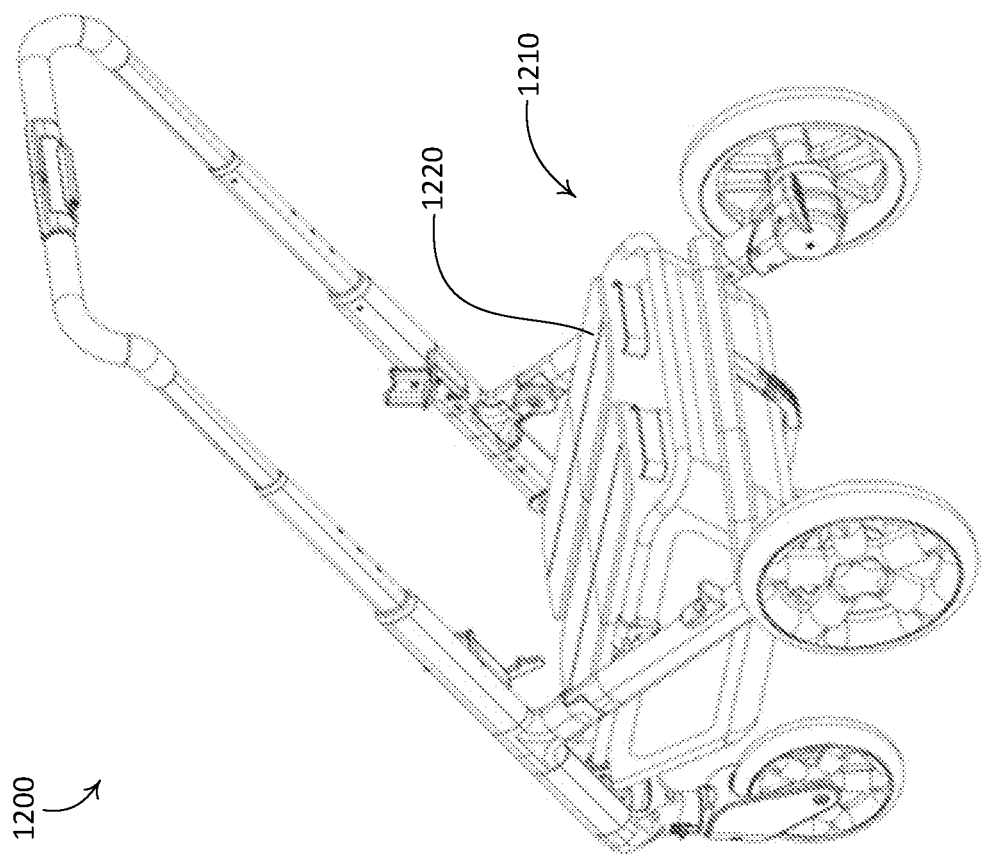
FIG. 12A is a rear isometric view of an example stroller assembly with a storage assembly that receives storage compartments.
Figure 12D:
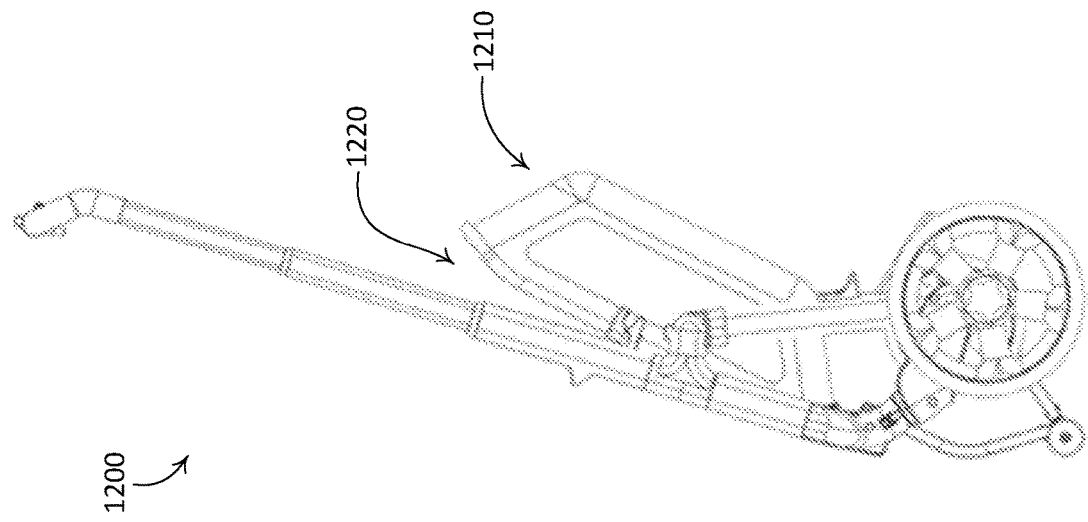
FIG. 12D is a side view of the example stroller assembly in a collapsed position with the storage assembly in a second position.
Figure 12C:
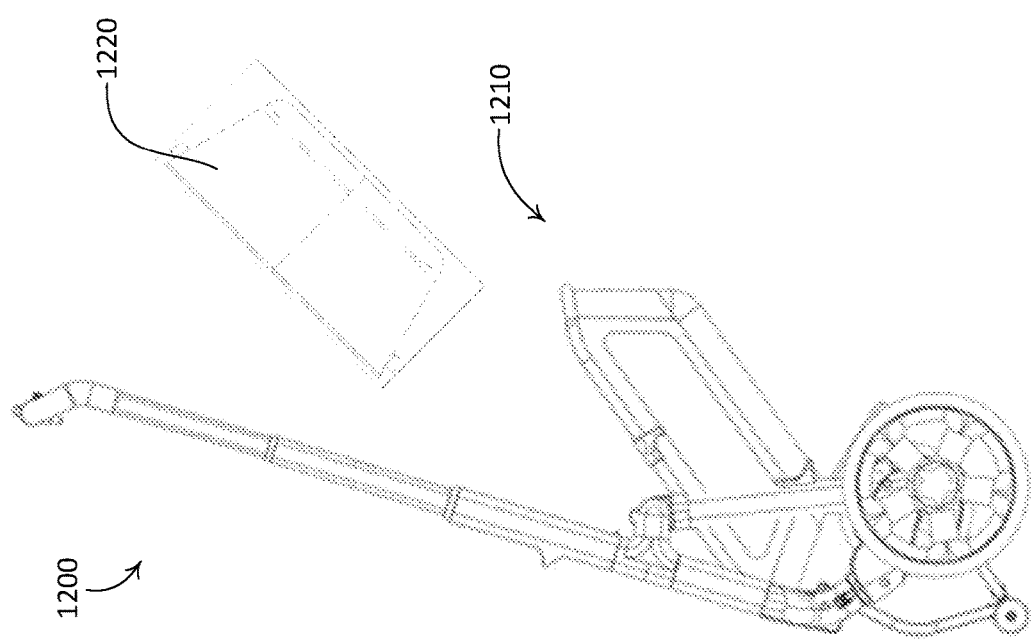
FIG. 12C is a side view of the example stroller assembly in a collapsed position with the storage assembly in a first position.

As shown in FIG. 12C, the storage compartments 1220 may be accessible when the stroller assembly 1200 is in a collapsed position. For example, storage compartments 1220 may be installed and/or removed when the storage assembly 1210 is in the first position (e.g., an access position). As shown in FIG. 12D, the storage compartments 1220 may not be accessible when the stroller assembly 1200 is in the collapsed position. For example, the storage compartments 1220 may not be installed and/or removed when the storage assembly 1210 is in the second position (e.g., a locked position).

Although not shown in the Figures, one skilled in the art would appreciate that a storage assembly may be pivotally connected to a front horizontal bar and/or a connection between the front horizontal bar and side bars of a stroller frame. For example, a coupling may be defined between a frame of the storage assembly and the front horizontal bar and/or the connection between the front horizontal bar and side bars of the stroller frame.

Although the stroller assemblies shown in the figures depict the rear wheel(s) supporting the stroller assembly in the collapsed position, those skilled in the art would appreciate that the front wheel(s) may support the stroller assembly in the collapsed position. For example, the stroller assembly may be configured such that the front wheel(s)

contact the ground and the rear wheel(s) do not contact the ground when the stroller assembly is in the collapsed position.

The invention claimed is:

1. A stroller assembly comprising:
a stroller frame comprising a front horizontal bar and a rear horizontal bar, the stroller frame configured to operate between an open position and a collapsed position such that the front horizontal bar moves toward the rear horizontal bar when the stroller frame is operated from the open position to the collapsed position and the front horizontal bar moves away from the rear horizontal bar when the stroller frame is operated from the collapsed position to the open position;
a plurality of wheels connected to the stroller frame, the plurality of wheels comprising one or more front wheels and one or more rear wheels; and
a support connected to the stroller frame, the support comprising a first arm, a second arm, and a support wheel, the first arm connected to the front horizontal bar and the second arm, the second arm connected to the rear horizontal bar and the first arm, wherein the support wheel does not contact the ground when the stroller frame is in the open position, and wherein the support and the one or more rear wheels are configured to support the stroller assembly in a substantially vertical position when the stroller frame is in the collapsed position.

2. The stroller assembly of claim 1, wherein the support comprises a revolute joint having a pin that extends therethrough, and wherein the support wheel is connected to the revolute joint.

3. The stroller assembly of claim 2, wherein the revolute joint comprises a female portion connected to an end of the first arm and a male portion connected to an end of the second arm, and wherein the female portion and the male portion define holes that are configured to receive the pin.

4. The stroller assembly of claim 1, wherein the support comprises a joint having a linkage connected to a sleeve, the sleeve configured to receive and slidingly operate along the first arm as the stroller frame is operated between the open position and the collapsed position, and wherein the linkage is connected to the second arm.

5. The stroller assembly of claim 4, wherein the joint comprises an extension extending from the sleeve, the extension configured to attach to the linkage via a revolute joint such that a pin extends through the linkage and the extension, wherein the support wheel is connected to the first arm.

6. The stroller assembly of claim 1, wherein the support comprises a joint having a linkage and a sleeve, the sleeve configured to receive and slidingly operate along the second arm as the stroller frame is operated between the open position and the collapsed position.

7. The stroller assembly of claim 1, wherein the support wheel is configured to abut the ground and rotate when the stroller frame is in the collapsed position to enable the stroller assembly to be pushed or pulled when in the substantially vertical position.

8. The stroller assembly of claim 1, wherein the first arm and the second arm are hollow aluminum tubes.

9. The stroller assembly of claim 1, further comprising a basket, wherein the support is below the basket when the stroller frame is in the open position.

10. The stroller assembly of claim 9, wherein the first arm is attached at a midpoint of the front horizontal bar and the second arm is attached at a midpoint of the rear horizontal bar, and wherein the support is curved to enable the basket to be installed above the support.

* * * * *